United States Patent
Liu et al.

(10) Patent No.: US 10,506,577 B2
(45) Date of Patent: *Dec. 10, 2019

(54) SYSTEMS AND METHODS FOR ADAPTIVE TRANSMISSIONS IN A WIRELESS NETWORK

(71) Applicant: Futurewei Technologies, Inc., Plano, TX (US)

(72) Inventors: Jialing Liu, Palatine, IL (US); Qian Cheng, Naperville, IL (US); Bingyu Qu, Rolling Meadows, IL (US); Weimin Xiao, Hoffman Estates, IL (US); Hossein Bagheri, Arlington Heights, IL (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/879,938

(22) Filed: Jan. 25, 2018

(65) Prior Publication Data

US 2018/0167921 A1  Jun. 14, 2018

Related U.S. Application Data

(63) Continuation of application No. 14/254,691, filed on Apr. 16, 2014, now Pat. No. 9,900,872.

(Continued)

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0035* (2013.01); *H04L 5/0053* (2013.01);
(Continued)

(58) Field of Classification Search
CPC . H04W 72/042; H04W 24/02; H04W 52/365; H04W 28/10; H04L 5/0053; H04L 5/0035; H04L 5/0073; H04L 5/001
(Continued)

(56) References Cited

U.S. PATENT DOCUMENTS 8,855,073 B2  10/2014  Han et al.
9,769,838 B2   9/2017  You et al.
(Continued)

FOREIGN PATENT DOCUMENTS

CN   102017698 A   4/2011
EP    0566551 A2  10/1993
(Continued)

OTHER PUBLICATIONS

Huawei et al. R4-130439, "Considerations on frequency offset tests in non-co-located antenna deployments," 3GPP TSG-RAN WG4 Meeting #66, St Julia's, Malta, Jan. 28-Feb. 1, 2013, 4 pages.

(Continued)

*Primary Examiner* — Jae Y Lee
*Assistant Examiner* — Jean F Voltaire
(74) *Attorney, Agent, or Firm* — Slater Matsil, LLP

(57) ABSTRACT

A method for cell adaptation includes receiving, by a user equipment (UE), one or more transmission parameters for a transition reference signal (TRS). One or more cells is transitioned between a reduced activity mode and an active transmission and reception mode in accordance with the TRS. The method further includes the UE determining whether or not to transmit the TRS in accordance with one or more TRS transmission criteria, and the UE transmitting the TRS in accordance with the one or more transmission parameters.

25 Claims, 16 Drawing Sheets

Related U.S. Application Data

(60) Provisional application No. 61/813,062, filed on Apr. 17, 2013.

(51) Int. Cl.

| | | |
|---|---|---|
| *H04W 52/36* | (2009.01) | |
| *H04W 24/02* | (2009.01) | |
| H04W 28/10 | (2009.01) | |
| H04W 72/00 | (2009.01) | |
| H04W 52/02 | (2009.01) | |
| H04W 76/27 | (2018.01) | |

(52) U.S. Cl.
CPC ........... *H04L 5/0073* (2013.01); *H04W 24/02* (2013.01); *H04W 52/365* (2013.01); *H04L 5/001* (2013.01); *H04W 28/10* (2013.01); *H04W 52/0235* (2013.01); *H04W 72/00* (2013.01); *H04W 76/27* (2018.02); *Y02D 70/1262* (2018.01); *Y02D 70/142* (2018.01); *Y02D 70/166* (2018.01)

(58) Field of Classification Search
USPC ......................................................... 370/329
See application file for complete search history.

(56) References Cited

U.S. PATENT DOCUMENTS

| | | | |
|---|---|---|---|
| 9,907,066 | B2 | 2/2018 | Park et al. |
| 2003/0109278 | A1* | 6/2003 | Cavalli ................. H04L 1/0003 455/553.1 |
| 2009/0092056 | A1* | 4/2009 | Kitazoe ............. H04W 36/0088 370/252 |
| 2010/0091727 | A1* | 4/2010 | Ishii ...................... H04W 72/04 370/329 |
| 2010/0298001 | A1 | 11/2010 | Dimou et al. |
| 2010/0309836 | A1* | 12/2010 | Sugawara ......... H04W 72/1231 370/312 |
| 2011/0141987 | A1 | 6/2011 | Nam et al. |
| 2012/0039302 | A1 | 2/2012 | Chun et al. |
| 2012/0087346 | A1 | 4/2012 | Lee et al. |
| 2012/0094661 | A1* | 4/2012 | Frenger ............... H04W 52/343 455/434 |
| 2012/0163305 | A1 | 6/2012 | Nimbalker et al. |
| 2012/0213109 | A1 | 8/2012 | Xu et al. |
| 2012/0287877 | A1* | 11/2012 | Han .................... H04W 74/002 370/329 |
| 2012/0307868 | A1* | 12/2012 | Zhou ..................... H04L 5/0035 375/130 |
| 2013/0028084 | A1* | 1/2013 | Aoyagi ............. H04W 52/0235 370/230 |
| 2013/0194931 | A1 | 8/2013 | Lee et al. |
| 2013/0322273 | A1 | 12/2013 | Etemad et al. |
| 2014/0198763 | A1 | 7/2014 | Sorrentino et al. |
| 2015/0092768 | A1 | 4/2015 | Ng et al. |
| 2015/0189574 | A1 | 7/2015 | Ng et al. |
| 2015/0249972 | A1 | 9/2015 | You et al. |
| 2016/0227519 | A1 | 8/2016 | Nimbalker et al. |
| 2016/0227526 | A1 | 8/2016 | Park et al. |
| 2017/0034799 | A1 | 2/2017 | Kim et al. |

FOREIGN PATENT DOCUMENTS

| | | | | |
|---|---|---|---|---|
| WO | 2012094608 | A2 | 7/2012 | |
| WO | WO-2012094608 | A2 * | 7/2012 | ............. H04B 7/024 |

OTHER PUBLICATIONS

TNO, et al., "BS probing approach for energy saving wake up in hotspot deployments," 3GPP TSG RAN WG3 Meeting #70, R3-103299, Jacksonville, Florida, Nov. 15-19, 2010, 4 pages.

CCMC: "Discussion on small cell architecture to support efficient operation", GRPP Draft; R1-131531_Discussion on Small Cell Architecture and Interfaces_Interface, 3rd Generation Partnership Project (3GPP), Mobile Competence Centre; 640, Route Des Lucioles; F-06921 Sophia-Ant, vol. RAN WG1, No. Chicago, USA; Apr. 15, 2013-Apr. 19, 5013, Apr. 5, 2013, XP050696860, Retrieved from the Internet: URL: http://www,3gpp.org/ftp/tsg_ran/WG1_RL1-TSGR1_72b/Docs; [retrieved on Apr. 5, 2013].

Huawei et al: "Small cell on/off for operation efficiency improvement", 3GPP Draft; R1-131163, 3rd Generation Partnership Project (3GPP), Mobile Competence Centre, F-06921 Sophia-Antipolis Cedex; France, vol. RAN WG1, No. Chicago, USA; Apr. 15, 2013-Apr. 19, 2013, Apr. 6, 2013, Retrieved from the internet: URL:http://www.3gpp.org/ftp/tsg_ran/WG1_RL1/TSGR1_72b/Docs/ [retrieved on Apr. 6, 2014].

Qualcomm Incorporated: "Small cell discovery", 3GPP Draft; R1-131408, 3rd Generation Partnership Project (3GPP), Mobile Competence Centre, F-06921 Sophia-Antipolis Cedex; France, vol. RAN WG1, No. Chicago, USA; Apr. 15, 2013-Apr. 19, 2013, Apr. 6, 2013, Retrieved from the internet: URL: http://www.3gpp.org/ftp/tsg_ran/WG1_RL1/TSGR1_72b/Docs/ [retrieved on Apr. 6, 2014].

Sony, "Discussion on RRM measurement procedures in small cell on/off operation," 3GPP TSG RAN WG1 Meeting #77, R1-142474, Seoul, Korea, Mar. 19-Apr. 23, 2014, 6 pages.

* cited by examiner

SYSTEMS AND METHODS FOR ADAPTIVE TRANSMISSIONS IN A WIRELESS NETWORK

This application is a continuation of U.S. patent application Ser. No. 14/254,691, filed on Apr. 16, 2014, entitled "Systems and Methods for Adaptive Transmissions in Wireless Network," which claims the benefit of U.S. Provisional Application No. 61/813,062, filed on Apr. 17, 2013 entitled "Systems and Methods for Adaptive Transmissions in Wireless Network," all of which applications are hereby incorporated herein by reference.

TECHNICAL FIELD

The present invention relates to systems and methods for wireless communications, and, in particular embodiments, to systems and methods for adaptive transmissions in wireless network.

BACKGROUND

Wireless communication systems include long term evolution (LTE), LTE-A, and LTE-A beyond systems. Typically, in a modern wireless communications system, there is a plurality of NodeBs (NBs) (also commonly referred to as base stations, communications controllers, or eNodeBs (enhanced NBs), and so on, and may even include network points using different radio access technologies (RATs) such as high speed packet access (HSPA) NBs and WiFi access points). A NodeB may be associated with a point or multiple points, and a cell may include a point or multiple points, with each point having a single or multiple antennas. A point may also correspond to multiple cells operating in multiple component carriers. The eNodeBs are interconnected with each other by means of an X2 interface. The eNodeBs are also connected by means of an S1 interface to a Mobility Management Entity (MME) and to a Serving Gateway (S-GW). Additionally, a cell or NB may be serving a number of users (also commonly referred to as User Equipment (UE), mobile stations, terminals, and so forth) over a period of time.

In a downlink transmission, reference signals (RSs) and other signals such as a data channel (physical downlink shared channel (PDSCH)), a control channel (physical downlink control channel (PDCCH)), and an enhanced PDCCH (ePDCCH) are orthogonal and multiplexed in different resource elements in the time-frequency domain. In an uplink transmission, physical uplink shared channel (PUSCH) and physical uplink control channel (PUCCH) are orthogonal and multiplexed in different time-frequency resources.

Generally, to enable any data channels in either uplink (UL) or downlink (DL) transmissions such as PDSCH or PUSCH of an LTE-A system, reference signals are transmitted. There are reference signals for a UE to perform channel/signal estimation/measurements for demodulation of PDCCH and other common channels as well as for some measurements and feedback (known as the Common/Cell-specific Reference Signal (CRS) inherited from the Rel-8/9 specification of E-UTRA). A Dedicated/De-modulation reference signal (DMRS) can be transmitted together with the PDSCH channel in Rel-10 of E-UTRA. DMRS is used for channel estimation during PDSCH demodulation. In Rel-10, Channel State Information Reference Signal (CSI-RS) is introduced in addition to CRS and DMRS. CSI-RS is used for Rel-10 UEs to measure the channel status, especially for multiple antennas cases. PMI/CQI/RI and other feedback information may be based on the measurement of CSI-RS for Rel-10 and beyond UE. PMI is the precoding matrix indicator, CQI is the channel quality indicator, and RI is the rank indicator of the precoding matrix. CSI-RS in Rel-10 can support up to eight transmission antennas while CRS can only support maximal 4 transmission antennas in Rel-8/9. The number of CSI-RS antenna ports can be 1, 2, 4, and 8. In addition, to support the same number of antenna ports, CSI-RS has much lower overhead due to its low density in time and frequency.

A heterogeneous network (HetNet) comprises high power macro points and various lower power points that generally may share the same communication resources. The lower power points may include, but are not limited to, picos, remote radio heads (RRHs), femtos (or home eNodeBs (HeNodeBs)), access points (APs), distributed antennas (DAS), relays, and near field communication points.

A network also may include several component carriers operating in different frequency bands. High frequency bands generally have a high pathloss over distance so they are more suitable to serve a relatively smaller area, such as used for high throughput purpose for nearby UEs. Low frequency bands generally have low pathloss over distance so they are more suitable to serve a relatively large area, such as used for providing coverage.

SUMMARY OF THE INVENTION

These and other problems are generally solved or circumvented, and technical advantages are generally achieved, by embodiments which provide a system and method for adaptive transmissions in a wireless network.

In accordance with an embodiment, a method for cell adaptation includes receiving, by a user equipment (UE), one or more transmission parameters for a transition reference signal (TRS). One or more cells is transitioned between a reduced activity mode and an active transmission and reception mode in accordance with the TRS. The method further includes the UE determining whether to transmit the TRS in accordance with one or more TRS transmission criteria, and the UE transmitting the TRS in accordance with the one or more transmission parameters when the UE determines to transmit the TRS.

In accordance with another embodiment, a user equipment (UE) includes a processor and a computer readable storage medium storing programming for execution by the processor. The programming including instructions to determine one or more transmission parameters for a transition reference signal (TRS), determine whether or not to transmit the TRS in accordance with one or more TRS transmission criteria, and transmit the TRS in accordance with the one or more transmission parameters. One or more first cells is transitioned between a reduced activity mode and an active transmission and reception mode in accordance with the TRS.

In accordance with another embodiment, a method for cell adaptation includes configuring, by a first cell, one or more transmission parameters for a transition reference signal (TRS) and transmitting, by the first cell, the one or more transmission parameters to a user equipment (UE). One or more second cells is transitioned between a reduced activity mode and an active transmission and reception mode in accordance with the TRS.

In accordance with yet another embodiment, a first network cell includes a processor and a computer readable storage medium storing programming for execution by the processor. The programming including instructions to configure, one or more transmission parameters for a transition reference signal (TRS), transmit the one or more transmission parameters to a user equipment (UE), and trigger transmission of the TRS by the UE in accordance with one or more TRS transmission criteria.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Various embodiments provide transmission, reception, and signaling methods and systems for adaptive transmissions in wireless networks. A network node/carrier/antenna set may be in a reduced activity mode and only perform limited monitoring activities (e.g., no CRS or CSI-RS transmissions may be performed by the node). In some embodiments, the reduced activity mode may include limited transmission of discovery reference signals (DRS) for UE detection of the small cells. Such a network node/carrier/antenna set may need to transition to data transmission/reception (Tx/Rx) mode (e.g., during which CRS and/or CSI-RS is transmitted) when a number of UEs enter its coverage area. With the assistance of the network, UEs meeting certain criteria (e.g., pathloss, load, mobility) may transmit special uplink physical layer signals (referred to as transition reference signals (TRSs)) using TRS transmission parameters (e.g., power level, time/frequency resources, hopping patterns, scrambling sequence, and the like) as configured by the network. Based on the received signal strength distributions/levels, the network node/carrier/antenna set determines if it should transition between a data Tx/Rx mode and a reduced activity mode. Thus, various small cells in the network may be dynamically configured based on network traffic situations.

Figure 1:
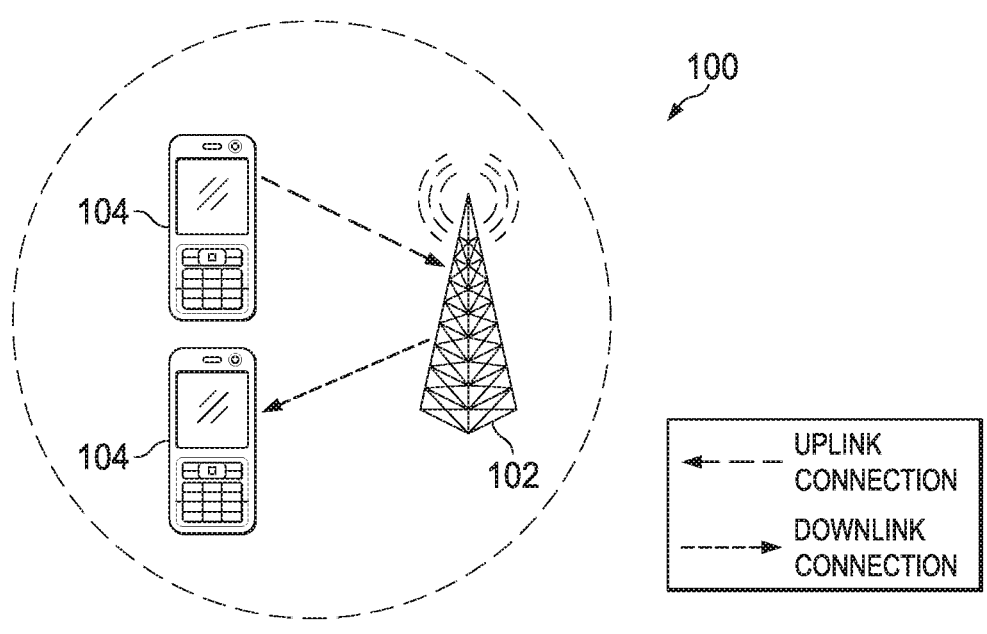
FIG. 1 illustrates downlink and uplink transmission.

FIGS. 1 through 6D illustrate various diagrams for describing network deployment and network signaling frameworks in accordance with various embodiments. Typically, in a modern wireless communications system, such as a Third Generation Partnership Project (3GPP) Long Term Evolution (LTE) compliant communications system, a plurality of cells or evolved NodeBs (eNodeB) (also commonly referred to as NodeBs, base stations (BSs), base terminal stations, communications controllers, network controllers, controllers, access points (APs), and so on) may be arranged into a cluster of cells, with each cell having multiple transmit antennas. Additionally, each cell or eNodeB may be serving a number of users (also commonly referred to as user equipment (UE), mobile stations, users, subscribers, terminals, and so forth) based on a priority metric, such as fairness, proportional fairness, round robin, and the like, over a period of time. It is noted that the terms cell, transmission points, and eNodeB may be used interchangeably. Distinction between cells, transmission points, and eNodeBs will be made where needed. As shown in FIG. 1, in network too, the transmission/reception from cell 102 to a UE 104 is called downlink (DL) transmission/reception, and the transmission/reception from UE 104 to cell 102 is called uplink (UL) transmission/reception.

In orthogonal frequency-division multiplexing (OFDM) systems, the frequency bandwidth is divided into multiple subcarriers in frequency domain. In time domain, one subframe is divided into multiple OFDM symbols. The OFDM symbol may have cyclic prefix to avoid the inter-symbol interference due to multiple path delays. One resource element (RE) is defined by the time-frequency resource within one subcarrier and one OFDM symbol. A reference signal and other signals, such as data channel, e.g. physical downlink shared channel (PDSCH), and control channel, e.g. physical downlink control channel (PDCCH), are orthogonal and multiplexed in different resource elements in time-frequency domain. Further, the signals are modulated and mapped into resource elements. Using inverse Fourier transform per each OFDM symbol, the signals in frequency domain are transformed into the signals in time domain, and are transmitted with added cyclic prefix to avoid the inter-symbol interference.

Figure 2:
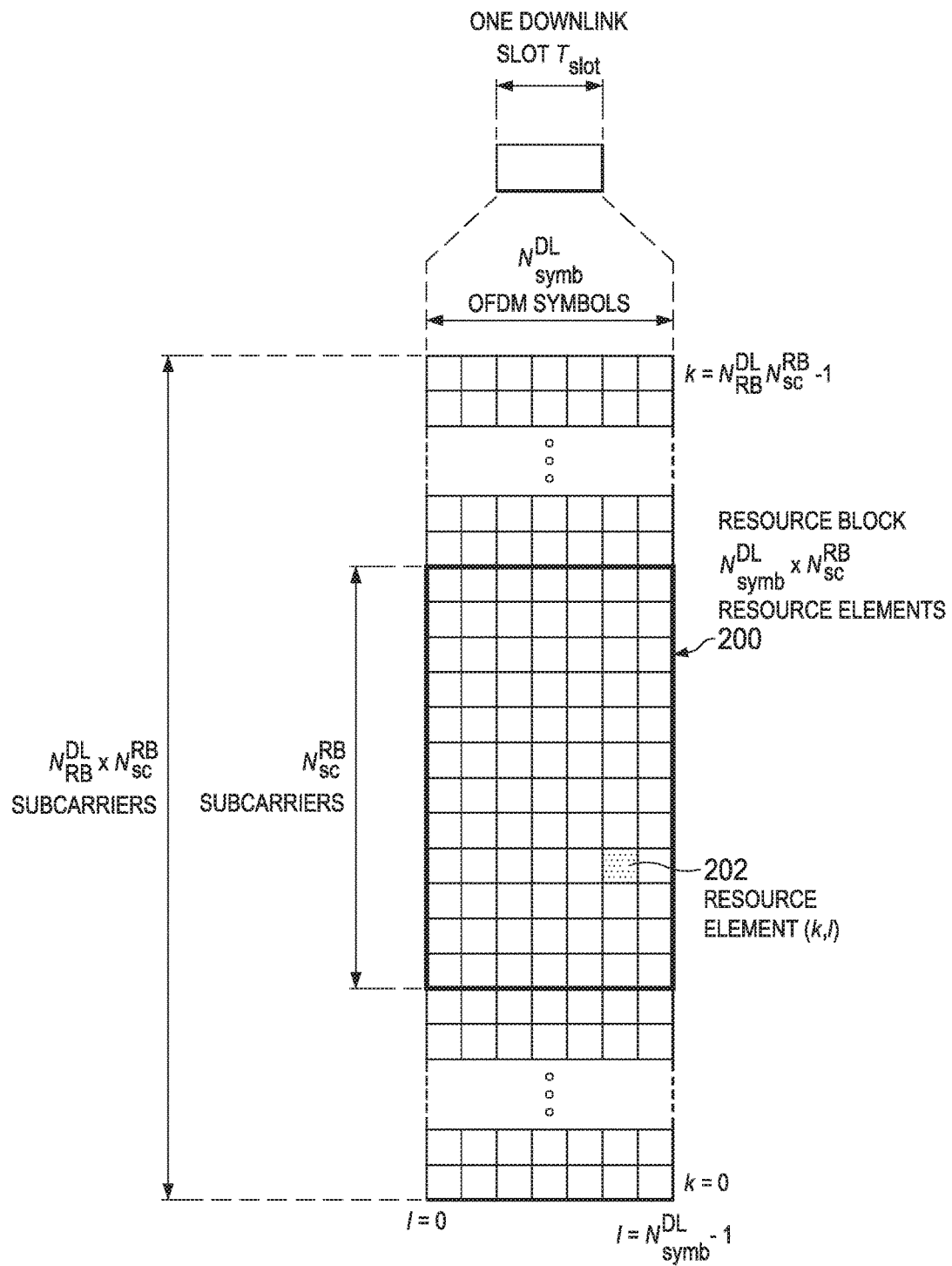
FIG. 2 illustrates example OFDM symbols with normal cyclic prefix (CP)

Each resource block (RB) contains a number of REs. FIG. 2 illustrates example OFDM symbols with normal cyclic prefix (CP). There are 14 OFDM symbols numbered from 0 to 13 in each subframe. The symbols 0 to 6 in each subframe correspond to even slots, and the symbols 7 to 13 in each subframe correspond to odd slots. In the figure, only one slot of a subframe is shown. There are 12 subcarriers numbered from 0 to 11 in each RB 200, and hence in this example, there are 132 REs 202 in RB 200 (note that only one slot of RB 200 is shown, and a RB spans two slots). Zero to three OFDM symbols in the even slots may be used for control channels and are not included in any RB for data transmissions. In each subframe, there are a number of RBs, and the number may depend on the bandwidth (BW).

Figure 3:
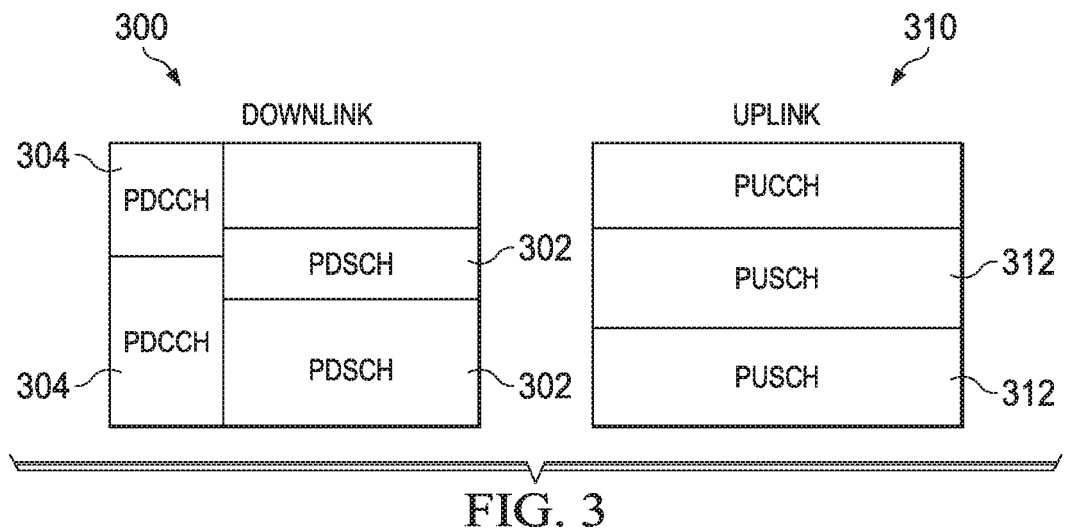
FIG. 3 illustrates example of physical data and control channels.

FIG. 3 illustrates frame structures 300 and 310 for downlink and uplink transmissions, respectively. Data channels transmitting data packets from eNodeB to UEs (e.g., cell 102 to UE 104) in the physical layer are called physical downlink shared channel (PDSCH) 302, and the data channel transmitting data packet from UEs to eNodeB (e.g., UE 104 to cell 102) in the physical layer are called physical uplink shared channel (PUSCH) 312. The corresponding physical control channels transmitted from eNodeB to UEs, indicate where the corresponding PDSCH and/or PUSCH is in frequency domain and in which manner the PDSCH and/or PUSCH is transmitted. These physical control channels are called physical downlink control channel (PDCCH) 304. In FIG. 3, PDCCH 304 may indicate the signaling for PDSCH 302 or PUSCH 312. A physical uplink control channel (PUCCH) in uplink frame structure 310 may be used for CSI feedback reporting, ACK/NACK reporting, and the like. In Release 11, the enhanced PDCCH (EPDCCH) is a downlink control channel to have a similar functionality as PDCCH 304, but the transmission of EPDCCH may be in the data region of an LTE Rel-8 system, and EPDCCH demodulation is based on the demodulation reference signal (DMRS) as opposed to CRS-based demodulation for PDCCH.

Figure 4:
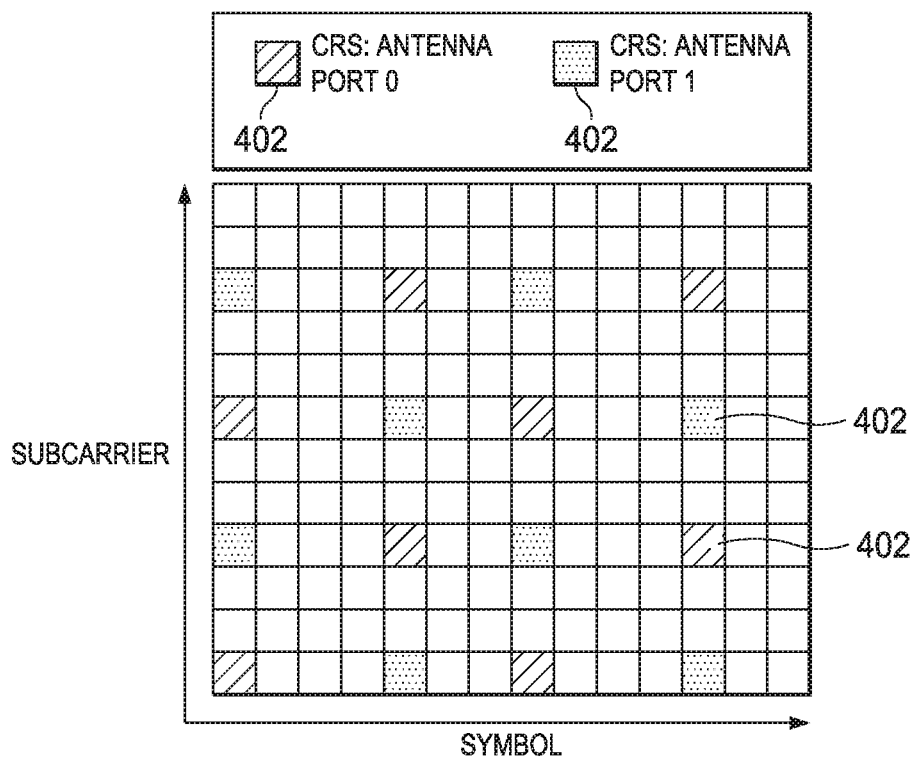
FIG. 4 illustrates example of common reference signal (CRS)

In downlink transmission of LTE-A system, there are reference signals for UEs to perform channel estimation for demodulation (e.g., of physical downlink control channel (PDCCH) and other common channels) as well as for channel measurement and feedback. These reference signals may include common/cell-specific reference signals (CRS) 402 inherited from the Rel-8/9 specification of E-UTRA, as shown in FIG. 4. Radio resource management (RRM) measurements, such as reference signal received power (RSRP), reference signal received quality (RSRQ), received signal strength indicator (RSSI), and the like may be derived from CRS 402.

Figure 5:
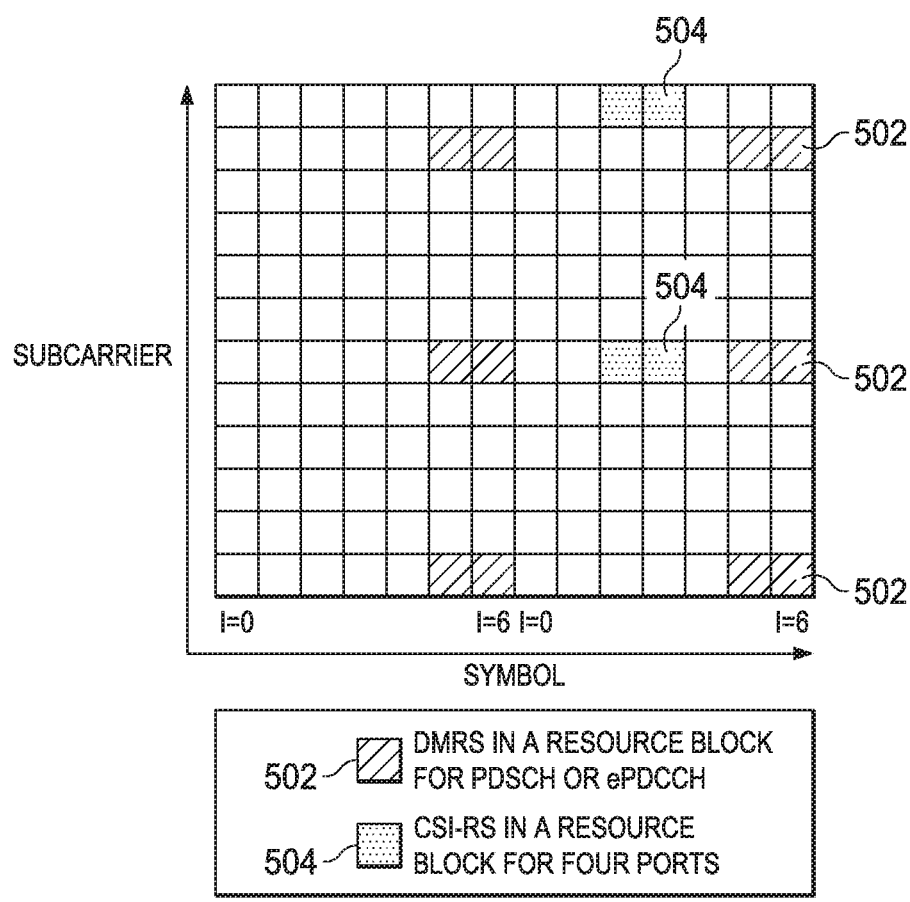
FIG. 5 illustrates example of CSI-RS and DMRS.

Other reference signals may also be transmitted as illustrated by FIG. 5. For example, dedicated/de-modulation reference signals (DMRS) 502 can be transmitted together with the physical downlink shared channel (PDSCH) channel in Rel-10 of E-UTRA. DMRS are used for channel estimation during PDSCH demodulation. DMRS can also be transmitted together with EPDCCH for the channel estimation of EPDCCH by the UE.

In Rel-10, channel status indicator reference signals (CSI-RS) 504 were also introduced in addition to CRS (common reference signal) and DMRS (dedicated demodulation reference signal). CSI-RS 504 is used for Rel-10 UEs to measure the channel status, especially for multiple antennas cases. Precoding matrix indicators (PMI), channel quality indicators (CQI), rank indicators (RI), and/or other feedback indicators may be based on the measurement of CSI-RS 504 for Rel-10 and beyond UE. There may be multiple CSI-RS 504 resources configured for a UE. There is specific time-frequency resource and scrambling code assigned by the eNodeB for each CSI-RS resource.

Reference signals (RS e.g. CRS, CSI-RS, and/or DMRS) may be used for a receiver to estimate the channel impulse response and/or channel power delay profile (PDP). RS is typically pseudorandom sequence quadrature phase shift keying (QPSK) modulated on the subcarriers assigned for RS transmission. Upon receiving the RS, a receiver performs demodulation and descrambling by multiply the conjugate of the pseudorandom sequence. The resulting signal is then transformed into time domain by an inverse fast Fourier transform (IFFT) operation to obtain the channel PDP estimation. Further measurements may be performed based on the obtained PDP estimates. RS from different transmitters may be assigned to different sets of subcarriers and hence are separated in frequency domain. RS from different transmitters may also be assigned to different pseudorandom sequences and hence are separated via low correlation between the pseudorandom sequences. However, RS may also be assigned to transmit on the same set of subcarriers and using the same pseudorandom sequence. In these cases, the RS can strongly interfere with each other. In current LTE systems, generally the use of the same pseudorandom sequence in RSs for different cells on the same set of time/frequency resources is done only if the cells are far apart from each other so that the RS interference may be reduced to an allowable range. Generally these factors are considered at the network planning level.

A heterogeneous network (HetNet) may include one or more macro cells and pico cells. Alternatively, a HetNet may include a higher power node/antenna providing a larger coverage area and lower power nodes/antennas providing a smaller coverage area. Lower power nodes (or lower power points, picos, femtos, micros, relay nodes, remote radio heads, remote radio units, distributed antennas, etc.) generally are low-power wireless access points that operate in a licensed spectrum. Lower power nodes provide improved cellular coverage, capacity and applications for homes and businesses, as well as metropolitan and rural public spaces.

In the 3GPP Rel-10 specification, a component carrier is called a cell. When multiple cells are controlled by a same eNodeB, cross scheduling of multiple cells is possible to implement because there may be a single scheduler in the same eNodeB to schedule the multiple cells. With carrier aggregation (CA), one eNodeB may operate and control several component carriers forming Pcell and Scell. In Rel-11 design, an eNodeB may control both a macro cell and a pico cell. In this case, the backhaul network between the macro cell and the pico cell is a fast backhaul. The eNodeB can control the transmission/reception of both macro cell and pico cell dynamically. The PDCCH or EPDCCH transmitted from the macro cells (or points) can be used to indicate the PDSCH or PUSCH transmitted from the pico cell (or points).

Usually, the eNodeBs may be arranged close to each other so that a decision made by a first eNodeB may have an impact on a second eNodeB. For example, the eNodeBs may use their transmit antenna arrays to form beams towards their UEs when serving them. This may mean that if the first eNodeB decides to serve a first UE in a particular time-frequency resource, it may form a beam pointing to that UE. However, the pointed beam may extend into a coverage area of the second eNodeB and cause interference to UEs served by the second eNodeB. The inter-cell interference (ICI) for small cell wireless communications systems is commonly referred to as an interference limited cell scenario, which may be different from a noise limited cell scenario seen in large cell wireless communications systems.

In Rel-12 or beyond design, the backhaul between the Macro cell and the Pico cell need not be fast backhaul. In other words, the backhaul may be slow backhaul, or any backhaul. In slow backhaul scenario, generally the PDCCH or EPDCCH transmitted from the macro cells (or points) cannot be used to indicate the PDSCH or PUSCH transmitted from the pico cell (or points).

In a realistic network, there may be multiple macro points and multiple pico points operating in multiple component carriers, and the backhaul between any two points can be fast backhaul or slow backhaul depending on network deployment. When two points have fast backhaul, the fast backhaul may be fully utilized, e.g., to simplify the communication method and system or to improve coordination. In a realistic network, the points configured for a UE for transmission or reception may include multiple points, some pairs of points may have fast backhaul, but some other pairs of points may have slow backhaul or any other type of backhaul.

In a realistic deployment, an eNodeB may control one or more cells. Multiple remote radio units may be connected to the same base band unit of the eNodeB by fiber cable, and thus, the latency between base band unit and remote radio unit may be quite small. Therefore the same base band unit can process the coordinated transmission/reception of multiple cells. For example, the eNodeB may coordinate the transmissions of multiple cells to a UE, which is called coordinated multiple point (CoMP) transmission. The eNodeB may also coordinate the reception of multiple cells from a UE, which is called CoMP reception. In this case, the backhaul link between these cells with the same eNodeB is fast backhaul and the scheduling of PDSCH transmitted in different cells for the UE can be easily coordinated in the same eNodeB.

Downlink coordinated multi-point (DL-CoMP) has been studied in the third generation partnership project (3GPP), and three main areas of focus have been identified. Specifically, the work for specifying CoMP support in Rel-11 focuses on joint transmission (JT), dynamic point selection (DPS) (including dynamic point blanking (DPB)), and coordinated scheduling/beamforming (CS/CB) (including dynamic point blanking). Generally, there are four CoMP scenarios as described below. A first CoMP scenario involves homogeneous networks with intra-site CoMP. A second CoMP scenario involves homogeneous networks with high transmission power remote radio heads (RRHs). A third CoMP scenario involves heterogeneous networks with low power RRHs within the macrocell coverage where the transmission/reception points created by the RRHs have different cell IDs as the macro cell. Finally, a fourth CoMP scenario involves heterogeneous network with low power RRHs within the macrocell coverage where the transmission/reception points created by the RRHs have the same cell IDs as the macro cell.

In the fourth CoMP scenario, a single shared cell-ID is used for multiple sites. In this case, cell ID-based transmission set configuration generally is not applicable. Generally CSI-RS-based configuration is used for scenario 4 instead of cell-ID based configuration.

An extension of the HetNet deployment may include densely-deployed small cells using low power nodes. This deployment is considered promising to cope with the increasing demands of mobile traffic explosion, especially for hotspot deployments in indoor and outdoor scenarios. A low-power node generally means a node whose transmission power is lower than macro node and BS classes, for example, pico and femto eNodeBs are both applicable. Small cell enhancements for E-UTRA and E-UTRAN may focus on additional functionalities for enhanced performance in hotspot areas for indoor and outdoor using possibly densely deployed low power nodes.

Figure 6A:
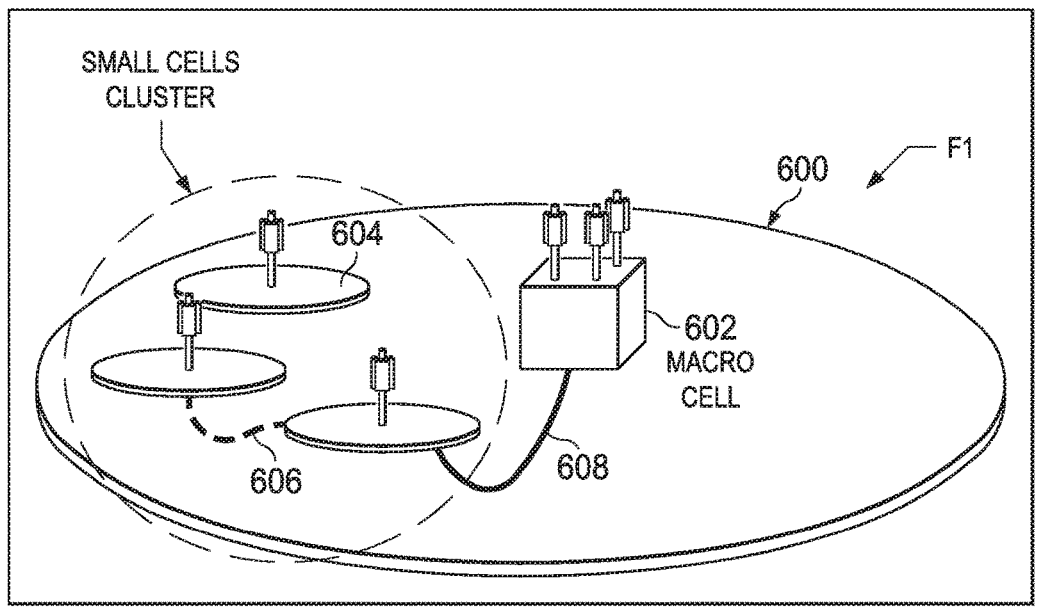
FIG. 6A illustrates a co-channel macro and small cells.
Figure 6B:
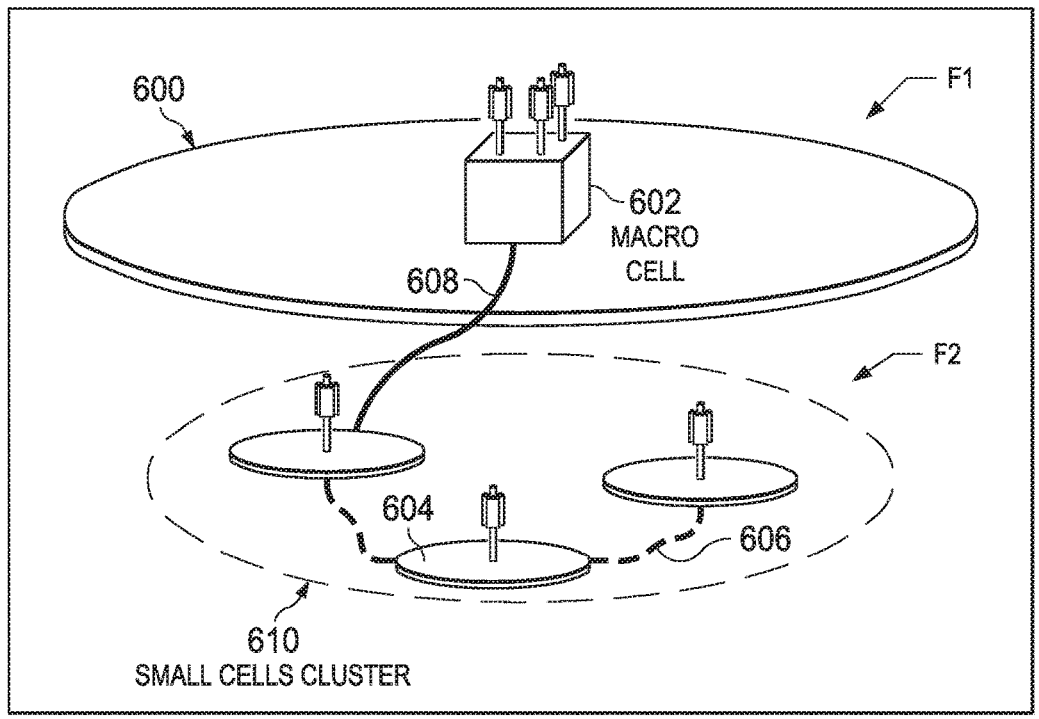
FIG. 6B illustrates a separate channel macro and outdoor small cells.
Figure 6C:
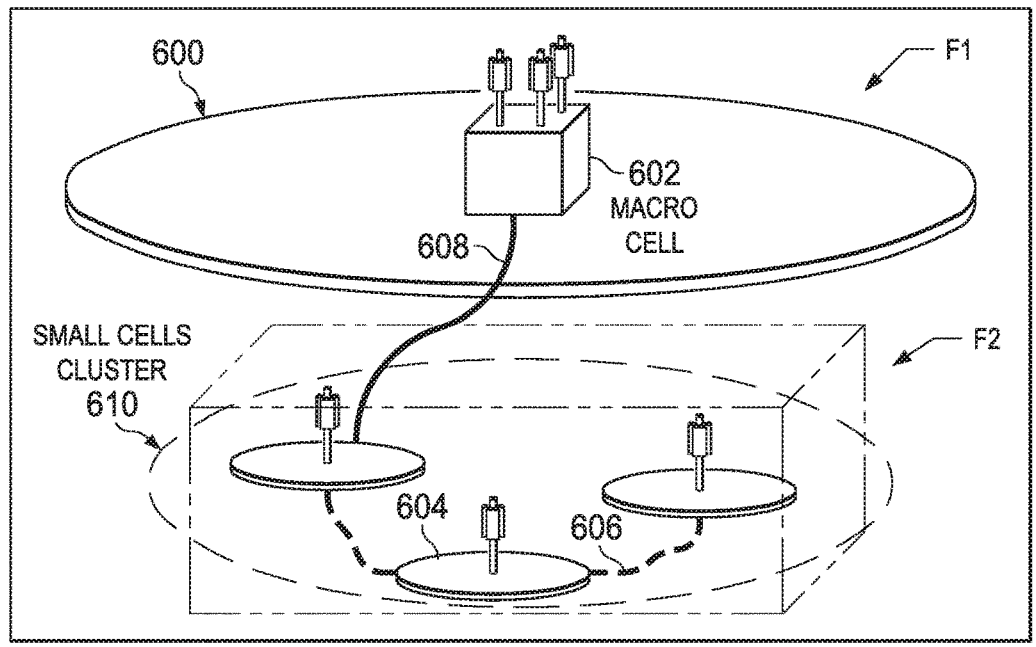
FIG. 6C illustrates a separate channel macro and indoor small cells.
Figure 6D:
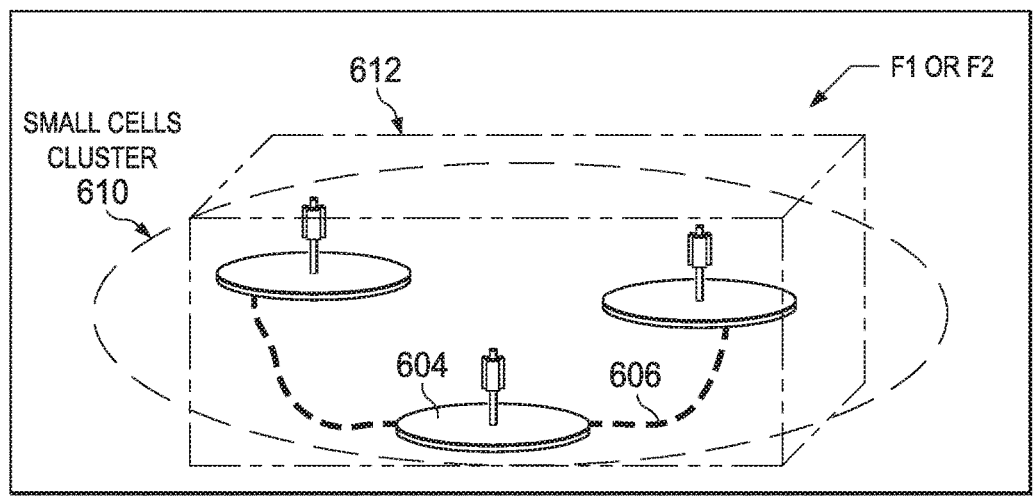
FIG. 6D illustrates small cells without macro coverage.

FIGS. 6A through 6D illustrate block diagrams of various small cell deployment scenarios. FIG. 6A illustrates co-channel macro cell 602 and small cells 604 sharing a channel 600. Backhaul links 606 interconnect a cluster of small cells 604 while backhaul link 60 connects the cluster of small cells 604 to macro cell 602. FIG. 6B illustrates a separate channel macro cell 602 and outdoor small cells 604 where macro cell 602 is in channel 600 and small cells 602 are in channel 610. FIG. 6C illustrates a separate channel macro cell 602 and indoor small cells 604 (e.g., in a building 612). FIG. 6D illustrates small cells 602 without macro cell coverage.

In an aspect of HetNet communications, UEs discover surrounding small cells for improved communication. Typically, a UE discovers surrounding small cells by first identifying the small cell through detecting a downlink primary synchronization signal (PSS) and/or a secondary synchronization signal (SSS). Secondly, UE performs signal power measurement based upon the downlink CRS of these identified cells from the first step. If the measured signal power is above a certain threshold, the cell discovery is considered successful. For mobility and other network operation optimization purposes, UE may be required to monitor several cells. To increase the chance the UE is able to discover weaker cells under one or two dominant strong interfering cells, interference cancellation (IC) technique may be employed in which the dominant strong interfering cells are first discovered and then their PSS/SSS/CRS are reconstructed and subtracted from UE received signal. Weaker cell discovery is then performed upon the remaining signal. In dense small cell scenarios, there could be several strong interferers of similar strength. Under this interference condition, interference cancellation techniques may be inadequate for cell detection due to the lack of a small number of dominant interferers.

In another small cell deployment scenario, efficient small cell operation may require the introduction of techniques for interference management where some small cells may be silent at certain times. With the reduced interference, it may be possible to maintain or even improve the network throughput performance with reduced network resources, in cases such as where the traffic load is light or medium. If the traffic load increases, on the other hand, the network may activate some inactive small cells to support the increased traffic load. For example, transmission of common signals can be avoided in certain subframes without negative impact to the UE measurements. On the other hand if such solutions consist of cells that stop transmitting for a long time, the discovery of these cells would become even more challenging.

An embodiment determines when and how a network point's (also referred to as a network cell and/or network node) state should be altered. For example, an embodiment determines when and how the network point should transition from a reduced activity mode (e.g., monitoring only a limited set of resources) to a data Tx/Rx mode (e.g., actively Tx/Rx data) or vice versa. An embodiment provides adaptive transmission based at least partially on TRSs. Embodiments may be applied to wireless handsets and networks used in wireless communication systems as well as other networks.

A network generally includes macro points and/or various low-power points, for example picos, RRHs, femtos (or home eNodeBs (HeNodeBs)), access points (APs), relays, distributed antennas (DASs), near field communication points, and the like. Macro points are used to provide wide area coverage, typically within a few hundred meters to a few kilometers of radius. The low-power points are generally used to provide high throughputs to UEs very close to the nodes, e.g., within several meters to tens of meters.

The service demand in a network may vary significantly in different geographic areas. In a worst case, such as during network rush hours or peak hours, the service demand can be much higher than normal. To cope with such situations, operators usually deploy their network infrastructure in a way such that peak service demand requirements can be met. This is generally attained by using relatively smaller macro cells (i.e. reduced cell sizes), combined with a considerable number of low-power nodes (LPNs) which are densely distributed and may even be redundant under a normal service condition. The LPNs may support multiple component carriers and frequency bands, which may also be redundant under a normal service condition.

However, such network infrastructure deployment, mainly targeted for peak service demands, becomes over-provisioned for off-peak service demands. The normal service demands can be significantly lower than the peak demands. In this case, the over-provisioning network is generally not optimal, or even not suitable for normal service demands. From an interference point of view, an over-provisioning network is difficult for interference management/coordination. Although various interference management approaches are available, they are intended to deal with specific interference conditions (such as almost blank subframes (ABS), intended to reduce macro interference when a macro strongly interferes with pico UEs in macro-pico deployments, and the like) instead of for addressing a dense and over-provisioning network. From an energy consumption point of view, keeping most of the network nodes active most of the time may waste a significant amount of energy. In addition, keeping most of the network nodes active most of the time may increase network operation complexity, cost, and chances for failures.

Therefore, it is generally desired to introduce higher degrees of flexibility and adaptability into the network, so that the network can better adapt its resources to varying service demands. For example, an eNodeB may control a set of antennas for a network point. The eNodeB may decide when to transition the network point to and from a data Tx/Rx mode (e.g., actively transmitting signals such as DL CRS, CSI-RS, and/or PDSCH) to a reduced activity mode (e.g., limited monitoring activity). Transitions between states may be in accordance with the number of UEs within the coverage area of the network point. For example, if the number of UEs in the coverage area of a network point is small, then the eNodeB may instruct the network point to operate in a reduced activity mode. Similarly, if the number of UEs in the coverage area of a network point is large, then the eNodeB may instruct the network point to operate in a data Tx/Rx mode.

Figure 7A:
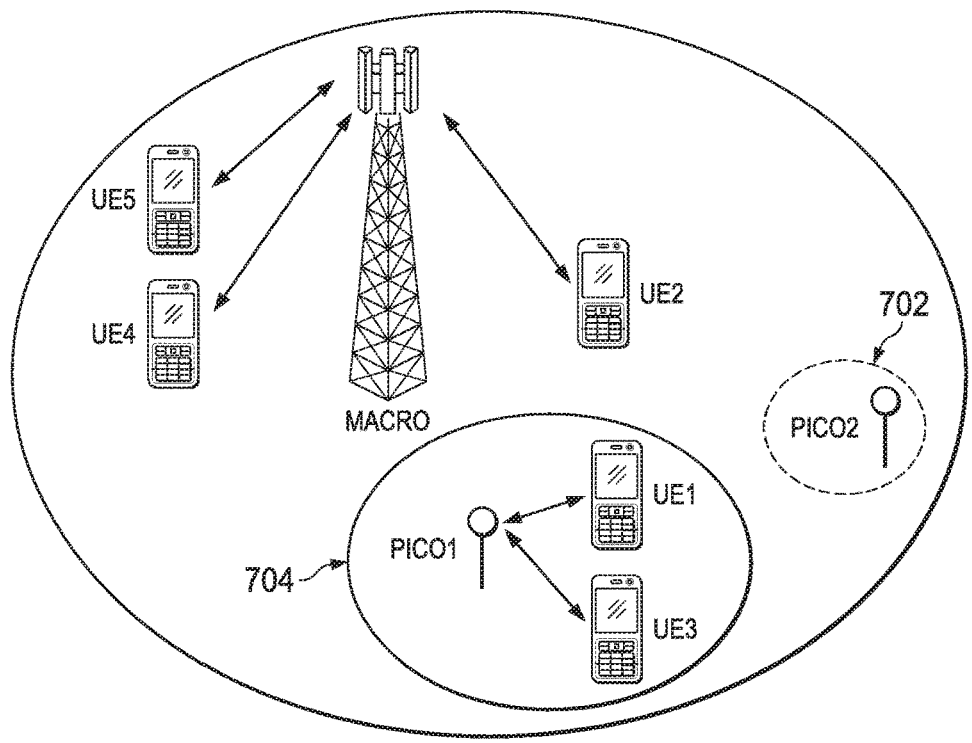
FIG. 7A illustrates a first pico cell serving UEs and a second pico not serving UEs.

As one specific example, in FIG. 7A it is shown that a network point Pico2 does not have any UEs within its coverage area 702 to serve. When this lasts for a period of time, it may be beneficial to reduce Pico2's Tx/Rx activities (illustrated by the dashed line around coverage area 702) to reduce interference, power consumption, and the like. Pico2 may turn off CRS and/or CSI-RS transmission and only monitor a limited set of resources in a reduced activity mode. In contrast to Pico2, a network point Pico1 is in active Tx/Rx mode and has UEs in its coverage area 704. Thus, Pico1 performs data Tx and/or Rx with UE1 and UE3, and Pico1 may transmit various RS, such as CRS and/or CSI-RS. A macro network point Macro serves UE2, UE4, and UE5.

Figure 7B:
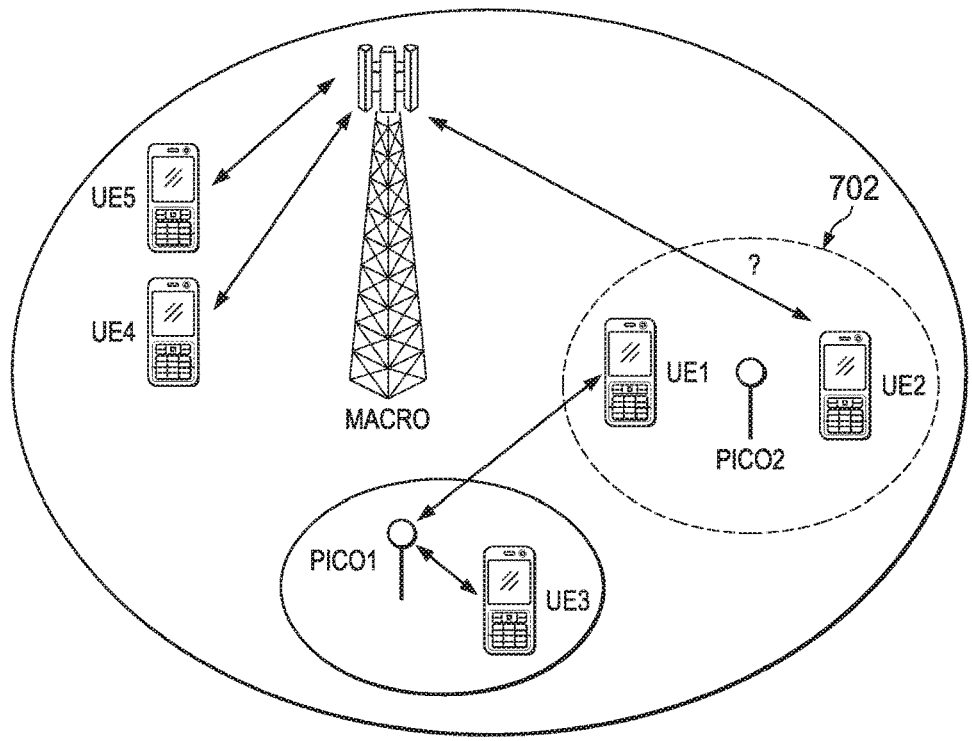
FIG. 7B illustrates UEs entering the area served by the second pico cell.

However, over time, UE configuration with in a network may change. For example, in FIG. 7B, more UEs (e.g., UE1 and UE2) move into coverage area 702 and it may be more difficult to server those UEs by currently active network points (e.g., Macro or Pico1). Thus, Pico2 and the network may benefit from a mechanism for deciding when and how to increase Pico2's Tx/Rx activities. Similar cases exist for other types of network points (eNodeBs, RRHs, relays, DAS, etc.), near field communication nodes, component carriers/frequencies, antenna sets, and the like and embodiments may be applied to these cases as well.

Figure 7C:
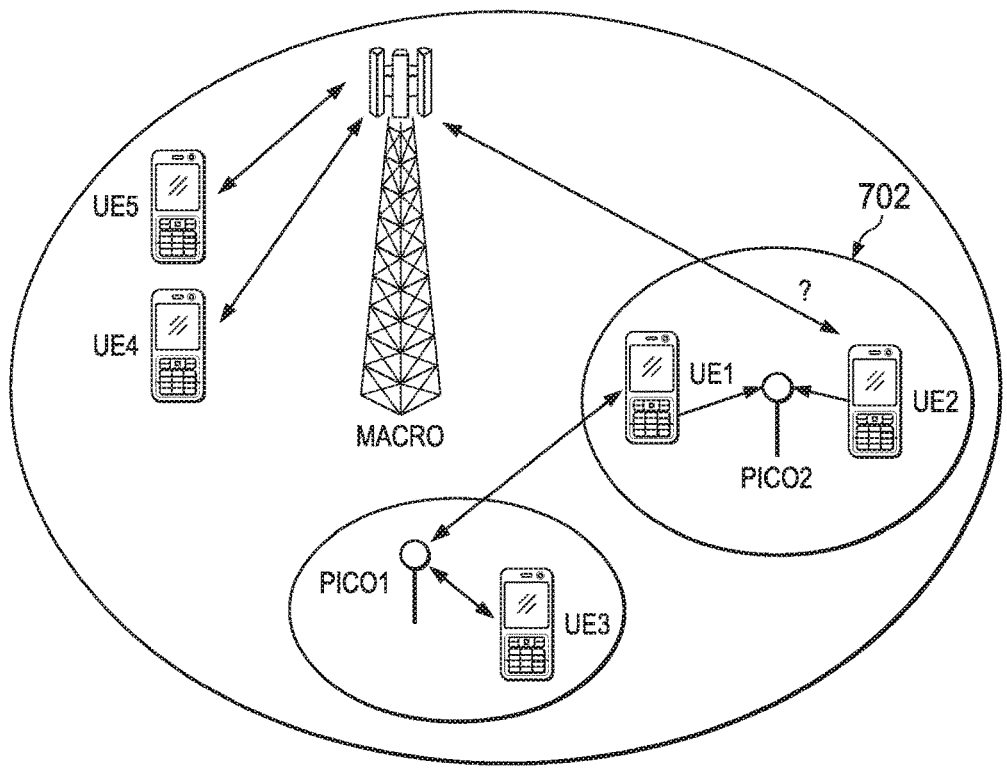
FIG. 7C illustrates an embodiment for adaptive transmission in the network.

An embodiment mechanism is illustrated in FIG. 7C. Because UE1 and UE2 detect relatively high pathloss to their serving points and can overload the network, the network may decide to seek alternative serving points for these UEs' traffic. Then the network may select UE1 and/or UE2, instruct them to send special UL physical signals, such as TRSs, on network designated resources using network configured power levels. Pico2 receives the TRSs, and may transition into a data Tx/Rx mode, for example, and may actively transmit CRS/CSI-RS and serve UE1 and/or UE2. Alternatively, Pico2 may stay in the reduced activity mode. The decision may be made by Macro which controls Pico2 based on the received TRS statistics on Pico2. In some embodiments, the decision may also be based on statistics from neighboring points (e.g., Pico1). The decision may also be made by other network entities such as a separate network controller (e.g., a mobility management entity (MME)), and the like.

Figure 7D:
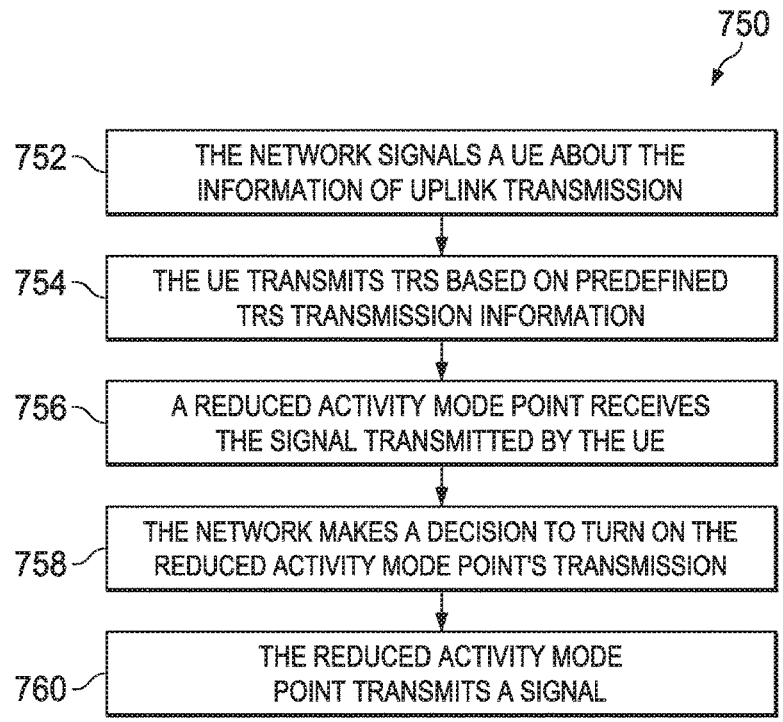
FIG. 7D illustrates a flowchart of an embodiment adaptation procedure associated with FIGS. 7A, 7B, and 7C.

The embodiment procedure associated with FIG. 7C is illustrated as flow 750 in FIG. 7D. In step 752, the network configures a UE with information for uplink transmission including TRS transmission parameters (e.g. TRS triggers, designated TRS resources, power level, scrambling sequences, and the like). In some embodiments, TRS transmission parameters may be at least partially predefined on the UE by an operator, for example, based on a standards specification. In step 754, the UE performs the TRS transmission based on configured TRS transmission parameters. In step 756, a reduced activity mode point receives the TRS transmitted by the UE. The TRS may also be received by an eNodeB or other network controller controlling the reduced activity mode point. In step 758, the network makes a decision regarding transmission or reception for the reduced activity mode point based on characteristics of the received TRS. For example, the network may decide whether the point should remain in a reduced activity mode or transition to a data Tx/Rx mode. The network may further decide to transition some active Tx/Rx mode points to a reduced activity mode based on the received TRS. For example, referring back to FIG. 7C, if the network identifies a more suitable point for serving UEs 1, 2, and 3 than Pico1, the network may transition Pico1 to a reduced activity mode. In some embodiments, Pico1 (or other active Tx/Rx mode point) may automatically (e.g., without explicit network instructions) transition to a reduced activity mode for example, when a TRS or other network signals are not received for a certain amount of time. In step 760, the point actively transmits/receives data or continues in a reduced activity mode based on the decision in in step 758.

The mechanism illustrated in FIGS. 7A through 7D may be adopted for more general transition/adaptation purposes, such as including turning a point on/off, making modifications to transmissions or reception schemes (e.g., selecting antenna sets, channels (e.g., PDSCH, CRS, CSI-RS), component carrier sets, frequencies, parameters for transmissions or reception, and the like).

The adaptive turning on and turning off (e.g., transiting between an active Tx/Rx mode and a reduced activity mode) of a small cell may be referred to as small cell on/off adaptation. When the small cell is turned on (e.g., in an active Tx/Rx mode), it may act as a legacy carrier and may transmit the signals existing in a legacy carrier and signals necessary for data transmission, such as reference signals used for measurements and demodulation. UEs may access the small cell and may receive data transmission from the cell. When the small cell is turned off (e.g., in a reduced activity mode), it does not transmit any legacy carrier signals or signals necessary for data transmission, and UEs may not access the small cell and may not receive data transmission from the cell. However, even if a small cell is turned off, its power amplifier (PA) for DL transmission may or may not be turned off. Furthermore, a turned off small cell may still perform limited signal transmissions, such as DRS transmissions for small cell discovery/adaptation.

A purpose of small cell on/off adaptation is for interference avoidance and coordination. A network may turn off certain small cells to reduce intercell interference, especially the interference caused by common channel transmissions such as CRS. With the reduced interference, it may be possible to maintain or even improve the network throughput performance with reduced network resources in cases such as where the traffic load is light or medium. If the traffic load increases, on the other hand, the network may turn on some turned-off small cells to support the heavier traffic load. Small cell on/off adaptation may also lead to some energy savings.

Figure 8:
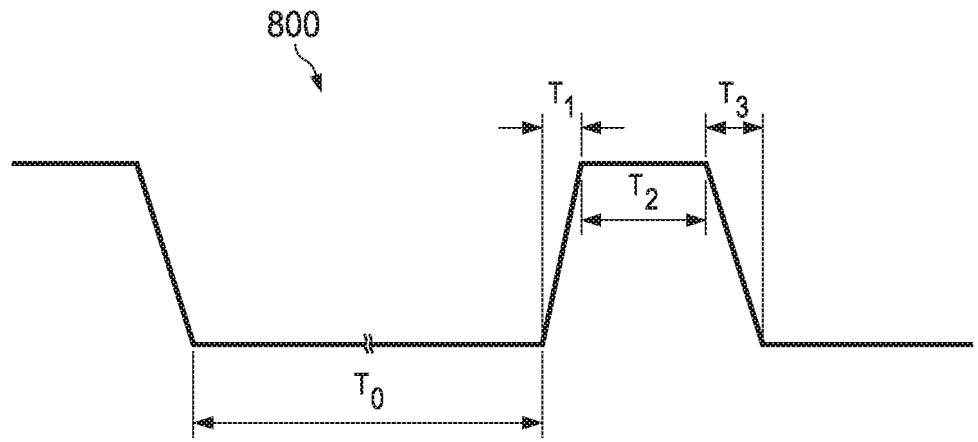
FIG. 8 illustrates timing diagram of small cell on/off adaptation.

FIG. 8 illustrates an example of the timing diagram 800 for small cell on/off adaptation. In FIG. 8, $T_0$ represents duration during which the small cell is turned off. $T_1$ represents the duration between the moment that a "turn on" decision is made and the moment that the small cell can transmit PDSCH. The length of $T_1$ may depend on the availability of sufficiently accurate UE measurements at the cell. In such embodiments, accurate UE measurements may further depend on, for example, how long it may take for the cell configurations to be detected by UEs or signaled to UEs (e.g., signaled from a macro cell), how long it may take for a UE to receive downlink signals from the small cell or transmit valid uplink signals to the small cell (related to the activation/deactivation delays), how long the stable measurements may take, UE reporting configurations, and the like. Thus, the time scale for $T_1$ may be of a few hundreds of milliseconds using currently existing procedures. $T_2$ represents the duration during which PDSCH can be transmitted. Whether/when/how the transmissions are performed may depend on implementations, e.g., the scheduler, transmission configurations, and the like. $T_3$ represents the duration between the moment that a "turn off" decision is made and the moment that the cell is turned off. The cell activity during this period may include handing over UEs (if any) to other cells, etc., which may take several milliseconds to a few hundreds of milliseconds.

In some embodiments, it may be desired to have $T_1$ and $T_3$ be sufficiently shorter than $T_2$ and $T_0$ since $T_1$ and $T_3$ may be viewed as transient or overhead timing. Small cell on/off adaptation cannot be faster than the time scales dictated by $T_1$ and $T_3$, the transient times needed for, e.g., stable measurement requirements, RRC signalling time scales, and the like.

Various solutions may be used to support the transitions between reduced activity mode (e.g., switched off) small cell and an active Tx/Rx mode small cell (e.g., switched on). One category of solution includes UL-signaling based solutions. For example, a small cell may monitor uplink transmissions for specific transition signals (e.g., TRS). The monitored uplink transmissions may include random access channel (RACH) transmissions, sounding reference signals (SRS), interference over thermal (IoT), modifications of other existing signals, new dedicated signals, or the like.

Another category of solution includes DL-signaling based solutions. The network decides to turn on certain DL channels (e.g., DRS) for UE measurements using various mechanisms such as periodic DL reference signal transmissions, which may be detected by UEs entering a small cell's coverage area. Details for transmitting a DRS according to some example embodiments are described in U.S. patent application Ser. No. 14/244,515, entitled "Device, Network, and Method for Utilizing a Downlink Discovery Reference Signal," filed on Apr. 3, 2014, which application is hereby incorporated in its entirety by reference. After detection, the network may trigger the small cell to transition to an active Tx/Rx mode, for example, based on load/location information sent from the UE. The trigger (e.g., a wake-up signal) may be sent by the network entity (e.g., a Macro eNodeB, MME, and the like) or by the UE (e.g., an UL TRS signal may be used as a trigger).

Note that the UL-signal based solutions may include the use of DL measurements for the network to make better transition decisions. Similarly, some DL-signal based solutions may use a UL signal such as the wake-up signal to trigger transition. In some embodiments, the DL reference signals for UE measurements may be triggered by a UL signal from UEs. New downlink signaling could also be envisaged to enable the network to alert UEs potentially in its proximity of its presence and trigger the transmission of a wake-up signal. Thus various solutions may use an UL-signaling based approach, a DL-signaling based approach, or a combination thereof.

The fundamental characteristics and general design features for UL-signal based solutions (e.g., incorporating TRS) are described in greater detail below. Generally, TRS are sent by a UE or a group of UEs to reach and discover an unknown, non-serving cell which may be in a reduced activity mode (e.g., the cell may be dormant, unseen, and/or unmeasured by the UEs). TRS are sent for wake up/discovery purposes, and the cell may not know which UEs are sending the TRS. TRS may be a modified, existing signal (e.g. SRS or RACH) to fulfill the above-mentioned purposes. Alternatively, TRS may be a new, dedicated signal.

A network may configure one or more TRS transmission parameters for transmitting the TRS to differentiate the TRS from other UL signals in their original forms particularly when the TRS is transmitted as a modified, existing signal. While other UL signals require the UE to detect and measure the target and then transmit accordingly (e.g. power control, sequence, timing, etc. are set for the target), TRS does not. For this reason TRS may have different power control, triggering conditions, and the like compared to other UL signals. The main design features of TRS include the following aspects: power control, triggering conditions and methods, resources and sequences, network coordination, and the like.

TRS power control may vary from that of SRS and RACH. For example, SRS power control is currently tied with PUSCH power control with an offset value, and RACH power control is based on a serving cell's RSRP with power ramping. Neither of these two power control formulas may be useful for allowing the TRS transmission power (or PSD) to reflect a UE's need to wake up a cell nearby. The inputs to determine TRS power may include UE experienced channel quality (e.g., long term SINR or RSSI), desire for more resources or throughput, how far the network would like the UE's transmission to reach, how many cells are turned off, the density of small cells in the neighborhood, the transmission power levels of the cells, the cell-selection biases for the cells, and the like. Therefore, the existing power control formulas may be modified and may include additional parameters as needed for TRS power control.

The network may configure some values (e.g., an offset value) that account for some inputs known and common to the networks (e.g. network load, network density). In addition, some inputs (e.g., inputs that are UE specific and time-varying or potentially new measurements/metrics at UE) are derived at the UEs and may be defined in a technical specification.

In some embodiments, fixed periodic transmission of TRS may not be efficient or flexible because the desire for cell reconfiguration (e.g. wake up, change power, and the like of a cell) may not be frequent or adhere to a strict period. Furthermore, cell reconfiguration may depend on not only the UE but also the condition of the network. Therefore some network triggering may be needed for TRS transmission.

Additionally, the network may provide some degree of freedom for UEs to independently decide when to transmit TRS, for example, based on information known to the UE (e.g. information about both the serving cell and neighboring cells). The network may also provide a common/group trigger signal to efficiently trigger UEs from multiple cells to transmit TRS. Some example TRS signaling triggers may include a network entity (e.g., eNodeB) configuring TRS transmission triggering thresholds on UEs or signaling TRS triggers to multiple UEs in common search space. In addition, even when the network triggers TRS signaling, a UE may not transmit TRS based on certain configured thresholds.

Multiple TRS transmissions may overlap on a same set of resources (though hopping on the resources is allowed) to reduce overhead since the dormant cell may not need to distinguish among transmitting UEs. The network may configure TRS resources for multiple UEs using a common/group signaling mechanism.

Current UL signals may include UE-specific scrambling sequences. In contrast, TRS may use the same sequence for multiple UEs. Even if energy detection is used, a scrambling sequence may still be used to better determine the total TRS power excluding interference (e.g., due potential timing issues discussed below). To reduce complexity of descrambling/FFT associated with multiple UE-specific sequences, the TRS may be scrambled using only a small handful of TRS-specific sequences. For example, a group UEs across multiple cells may use the same TRS-specific sequence for TRS transmission. The network may configure these TRS-specific sequences by defining the sequences in a technical specification or through common/group trigger signaling.

A source of interference may be due to a potential timing issue. UL timing advance (TA) is targeted for a serving cell. A cell-edge UE transmits earlier and may be closer to the dormant cell, and a cell-center UE transmits later and may be farther to the dormant cell. Hence different arrival times of the TRS at the dormant cell are expected, which may cause a non-TRS signal from a UE to overlap with a TRS signal from another UE. The overlap may be about the size of CP. TRS-specific scrambling sequences may be applied to reduce such interference.

Furthermore, the TRS transmission parameters may include identifying a target virtual cell as a target receiver of TRS transmissions. The target virtual cell may be common among a group of UEs. For example, the network may signal a VCID of the virtual cell for TRS transmissions. A reference serving cell may also be identified. The reference serving cell may be a physical cell in an active Tx/Rx mode (e.g., sending RS such as CSR/CSI-RS), and the UEs may monitor RSs from the reference serving cell for TRS transmissions (e.g., timing, pathloss, and the like). As discussed in further detail below, the reference serving cell may be a cell having a quasi-co-located (QCL) relationship with the virtual cell.

Various embodiments provide coordination and message exchange between various network entities for TRS operations. These design aspects of the distinctive resource/sequence as well as its configuration, power control, and triggering mechanism set TRS apart from other signals even when TRS is based on existing signals, such as SRS or PRACH.

Figure 9:
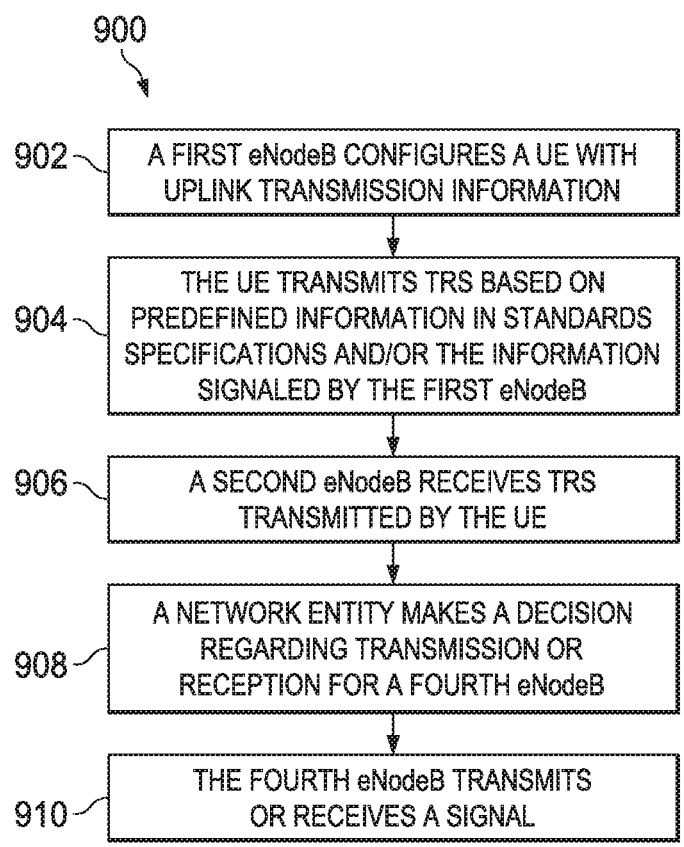
FIG. 9 illustrates a flowchart of an embodiment adaptation procedure.
Figure 10:
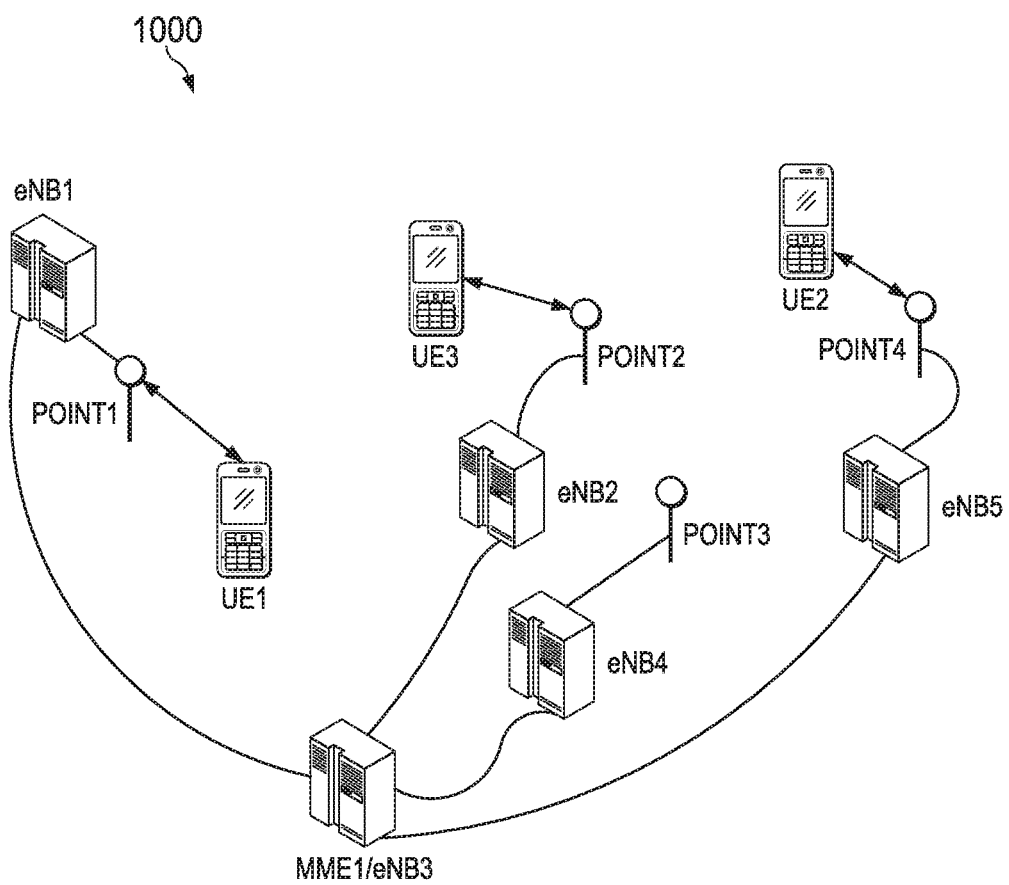
FIG. 10 illustrates an embodiment system for adaptation.

An embodiment system generally may transmit/receive uplink TRS signals according to process flow 900 as illustrated by FIG. 9. For ease of discussion, process flow 900 may be described in conjunction with network block diagram 1000 illustrated in FIG. 10. Although FIG. 10 generally refers to various point1, point2, and so on, these points may also represent cell1, cell2, and so on, or component carrier 1, component carrier 2, and so forth.

In step 902, a first eNodeB (eNodeB1) configures a UE (UE1) with uplink transmission information (e.g., TRS transmission parameters). For example, eNodeB1 may signal the uplink transmission information to the UE1. UE1 may be in a serving cell controlled by eNodeB1, and eNodeB1 may signal the information about uplink transmission using upper layer signaling, such as dedicated radio resource control (RRC) signaling.

eNodeB1 may signal TRS transmission parameters for UE1. These TRS transmission parameters include transmission power of UE1 for the TRS, time-frequency resource allocation of the TRS, a scrambling sequence for the TRS, hopping patterns of the TRS, a target receiver for TRS (e.g., a virtual receiver), triggering mechanisms for TRS, and the like. The TRS transmission parameters may be used in step 904 of process flow 900 as further discussed below. eNodeB1 may decide the TRS transmission parameters based on criteria such as UE capability, traffic load, pathloss, uplink power headroom, and the like. For example, a higher maximal transmission power capability, larger traffic load, larger pathloss, or lower power headroom of UE1 may result in eNodeB1 configuring more time-frequency resources or transmission power for TRS. In other words, the amount of TRS transmission power or TRS time-frequency resources may reflect the degree of transmission requirement to another point for transmission or reception. If the UEs sending TRSs are served by points/cells controlled by different eNodeBs (e.g., a UE1 is associated with eNodeB1 and UE2 with eNodeB5), TRS transmission parameters may be coordinated through information exchange between eNodeB1 and eNodeB5 via X2 interface and/or between eNodeB1/eNodeB5 and MME via S1 interface.

Alternatively, UE1 may transmit the TRS whose configuration is predefined in a standard specification. In such embodiment step 902 may be may be simplified or skipped, and UE1 or eNodeB1 may only decide whether to transmit the TRS.

As a further part of step 902, eNodeB1 may trigger the transmission of TRS by UE1 based on various TRS transmission criteria. Note that the criteria may not be solely for TRS purposes (such criteria may also be used for other purposes). Some conditions/criteria to trigger an aperiodic RRM measurement report may be reused for TRS triggering, such as Event A2 (serving cell becomes worse than threshold), Event A3 (neighbor cell becomes offset better than PCell), Event A4 (neighbor cell becomes better than threshold), Event A5 (PCell becomes worse than threshold1 and neighbor cell becomes better than threshold2), Event A6 (neighbor cell becomes offset better than SCell), Event B1 (Inter RAT neighbor cell becomes better than threshold), Event B2 (PCell becomes worse than threshold1 and inter RAT neighbor cell becomes better than threshold2), and so on. Variations of these events may also be used for TRS triggering.

As another example, in an embodiment, eNodeB1 may trigger UE1 to transmit the TRS if UE1's pathloss to a point1 of UE1's serving cell is higher than a network-chosen TRS transmission trigger threshold. Point1 may be the point of UE1's serving cell that is transmitting DL RS or PDCCH to UE1. The eNodeB1 may receive measurement data (e.g., a measurement report) regarding TRS transmission criteria for point1 from UE1 and determine a pathloss value derived from the measurement data and the transmission power of point. Such measurement data may be dedicated for TRS transmissions, or the measurement data may be used for other purposes in addition to TRS. For example, the measurement data may be received in a RSRP report. eNodeB1 may then compare the determined pathloss value to the threshold. If UE1's pathloss is greater than the threshold, eNodeB1 may signal UE1 to transmit the TRS.

Other TRS transmission criteria may be considered in addition to pathloss, such as, traffic load of UE1, quality of service (QoS) requirement of UE1, traffic load of eNodeB1, traffic load of other network entities, power headroom of UE1, RSRP data, RSRQ data, CQI data, interference statistics data, any combination of some or all of the above criteria, and the like. Generally, if eNodeB1 or UE1 is experiencing weak connection, low throughput, higher traffic load compared to other network entities, lower than the expected QoS, and the like, eNodeB1 may trigger UE1 to transmit TRS to look for alternative and/or additional network resources. For example, if the traffic load of UE1 or the traffic load of eNodeB1 is lower than a threshold, eNodeB1 may not trigger UE1 to transmit the TRS because the current serving cell may be sufficient to satisfy UE1's the throughput requirement. Otherwise, eNodeB1 may instruct UE1 to transmit the TRS. As another example, if the power headroom reported by UE1 for uplink transmission is larger than a threshold, there may be sufficient power for UE1 to use. Thus, eNodeB1 may not trigger TRS transmission. As another example, if eNodeB1 is overloaded and finds that the load of another network entity is low (e.g., the load difference between the two entities is larger than a threshold), eNodeB1 may trigger UE1 to transmit TRS so that a point controlled by the other network entity may be activated to serve UE1. As yet another example, if the RSRP of UE1 is lower than a threshold or if the RSRQ/CQI of UE1 is lower than a threshold, eNodeB1 may instruct UE1 to transmit TRS.

In alternative embodiments, eNodeB1 may signal a pathloss threshold to UE1 as part of the TRS transmission parameters. In such embodiments, UE1 may estimates the pathloss from the RSRP and the transmission power of a RS of point1. eNodeB1 may signal which points/cells/carrier/frequency that the threshold should be applied to. UE1 sends the TRS if its pathloss is greater than the threshold. Configured triggering criteria may also consider UE1's capability, traffic load, QoS requirement, uplink power headroom, RSRP, RSRQ, CQI, and the like. For example, eNodeB1 may signal a RSRQ threshold to UE1, and UE1 sends the TRS if its RSRQ is less than the threshold.

Unlike existing UL signals such as PUSCH, PUCCH, SRS, UL DMRS, etc., TRS may not to be transmitted by all UEs on a regular basis. Normally PUSCH, PUCCH, SRS, UL DMRS, etc. are configured to transmit regularly by all UEs. In contrast, TRS is generally configured to transmit by selected UEs or qualifying UEs and only at times when one or more conditions as specified above are met by those UEs on an on-demand basis. This characteristic generally makes TRS more advantageous than existing UL signals to achieve transition/adaptation, since it is generally not necessary or resource-consuming to let all UEs transmit regularly to achieve transition/adaptation. However, the existing UL signals may be appropriately modified/extended/enhanced to have similar characteristic as the TRS and achieve a similar effect as the TRS, such as being used in determining a transition/adaptation if some metrics derived from the received signal statistics satisfy some criteria.

In step 904, UE1 transmits TRS as triggered (e.g., either directly by eNodeB1 or by configured criteria). UE1 may transmit a signal, such as TRS, with a power level on a set of time-frequency resources based on the configuration TRS transmission parameters (as defined by step 902). UE2 may transmit the same modulated symbols as UE1 on a set of possibly overlapping time-frequency resources, thus allowing soft combining of the received TRSs at the receiver side on the set of overlapping time-frequency resources. Various examples are given below.

For example, the TRS transmitted by UE1 may be over one or more RBs or one or more sets of REs and one or more OFDM/SC-FDMA symbols, similar to the UL DMRS in a LTE system. The sequence modulated in subcarriers of a RB may be a Zadoff-Chu like sequence. There may be another UE, e.g., UE2, transmitting the same TRS. Hence in the receiver side, it may be possible to have power detection of the combined TRS from the two UEs. In other words, in the receiver side correlation with the sequence to demodulate the TRS may be applied before performing the power detection.

In an embodiment, all UEs served by a point/cell of eNodeB1 may transmit at a same power level specified by eNodeB. Therefore, the more UEs transmit, and the closer the UEs to the monitoring point, the stronger the monitor point (e.g., a point2 controlled by an eNodeB2) can receive the TRS. This is a way for the network to determine roughly how many UEs are close to point2 and how far they are from point2.

In an embodiment, UE1 may be configured by eNodeB1 to transmit at one of several power levels. UE1 may choose one of the configured levels based on several TRS power level criteria, such as UE1's pathloss to point1, UE1's pathloss or RSRP difference to point1 and to a candidate (e.g., strongest) point from UE1's perspective (e.g., if there is a strong neighbor cell, then the UE may transmit at a lower level), UE1's traffic load, RSRQ, UE capability, and the like. The higher the UE1's pathloss, the larger the UE1's traffic load, and/or the lower the UE1's RSRQ, the higher the power level UE1 may choose to transmit the TRS and the stronger the TRS point2 receives. This is a way for the network to determine roughly the need/benefit for a transition/adaptation.

In an embodiment, UE1 may transmit a TRS with a power level given by a power control equation defined by the TRS transmission parameters. The power level may be computed by UE1 in a way such as $$P_{TRS} = \min\{P_{CMAX}, P_O + f(PL)\}[dBm] \quad \text{(Eq. 1)}$$

where $P_{CMAX}$ is the configured maximum UE transmit power, $P_O$ and $f(\bullet)$ (which may simply take form as a linear scaling function) are parameters/configurations signaled by eNodeB1, and PL is the pathloss from point1. Power level parameters/configurations may or may not be the same as those used for PUSCH/PUCCH/SRS power control. Therefore, a higher pathloss from the serving point implies that UE1 is in higher need for an alternative serving point, and UE1 should transmit at higher power. In this equation, the values for $P_{CMAX}$, $P_O$ may be signaled to the UE different from existing power control parameters used for PUSCH/PUCCH/DMRS/SRS/RACH and may be TRS specific. The PL value may be the pathloss with respect to a serving cell measured by the UE. PL may also be a value configured by the network, and the network may configure a pathloss value for the UE to determine the TRS power. Such a pathloss may be viewed as associated with a virtual, unseen cell. Alternatively, if UE1's RSRQ to point1 is selected by the network as a parameter to determine UE1's TRS power, then Eq. (1) can be accordingly modified so that UE1 transmits TRS at a higher power if it has a lower RSRQ to point1. Similar equations may be modified for RSRP, packet throughput, user perceived throughput, instantaneous rate, and so on. For example, power level equations may be defined as $P_{TRS}=\min\{P_{CMAX}, P_O+f(RSRP)\}$, $P_{TRS}=\min\{P_{CMAX}, P_O+f(RSRQ)\}$, $P_{TRS}=\min\{P_{CMAX}, P_O+f(SINR)\}$, $P_{TRS}=\min\{P_{CMAX}, P_O+f(INR)\}$, $P_{TRS}=\min\{P_{CMAX}, P_O+f(SNR)\}$, $P_{TRS}=\min\{P_{CMAX}, P_O+f(I)\}$, and, where SINR may be the long-term SINR of the UE with respect to a configured serving cell, INR may be the long-term interference plus noise ratio (interference may be for a configured serving cell or a virtual cell), SNR may be the signal to noise ratio with respect to a configured serving cell, and I may be the interference with respect to a configured serving cell or a virtual cell. In general, the long-term statistics of such a quantity may not be a single value but a distribution, and the function $f$ may be applied to a statistical distribution (such as taking the mean, variance, a certain percentile point, etc.). These different equations may be useful in different scenarios, such as RSRP may reflect the received signal strength of the current serving cell but it may not reflect serving cell loading nor interference. RSRQ may reflect the received signal strength of the current serving cell and serving cell loading as well as interference, but it may not reflect the potential transmission rate due to the specific way the RSSI is computed. The long-term SINR may generally reflect the potential transmission rate but it may not reflect the serving cell loading. The interference may reflect the interference strength but it may not reflect the serving cell signal strength, and the like. Specific formulas may be selected according to the actual needs of the network, and possible combinations may be used. Furthermore, $P_O$ may reflect the network's need/desire/potential to turn on a cell, depending on, e.g., how many cells are turned off, the density of small cells in the neighborhood, and the like. For example, if the network has a high density of small cells, the network may use a small $P_O$. Otherwise, the network may use a high $P_O$. If the network has many small cells that are turned off, the network may use a small $P_O$, otherwise the network may use a high $P_O$. In still other embodiments, the network may not ask the UE to transmit TRS at all.

In an embodiment, UE1 may transmit its TRS with a specified power signaled by eNodeB1. The power level may be computed by eNodeB1 to reflect the network/UE's needs or potential benefits to have additional assistance from a reduced activity mode point. For example, if eNodeB1 has a lot of UEs to serve or high traffic load, it can signal a high power value to UE1. For another example, in case that both UE1 and UE2 are seeking alternative serving points but the network configures only UE1 to transmit TRS, UE1 can be configured at a power level higher than that with only UE1 seeking an alternative serving point. Alternatively, eNodeB1 may signal a power offset for UE1 to apply to the power level computed from a power level equation; in this case the power may become $$P_{TRS}=\min\{P_{CMAX}, P_O+f(PL)+P_{offset}\}[dBm] \qquad \text{(Eq. 2)}$$

where $P_{offset}$ is the UE-specifically signaled power offset which may be chosen from a set of pre-fixed values in a list known by both eNodeB1 and UE1. Another way is to have $P_{TRS}=\min\{P_{CMAX}, P_O+f(PL+\delta)+P_{offset}\}$ where $\delta$ is applied to the PL (or generally a UE measured value) directly, which may be a function of the cell loading (e.g., the cell's resource utilization ratio UR/loading, or a function of it, such as a truncated linear function with a slope and one or two truncate values). Note that in general the parameters/configurations in Eq. (1) and Eq. (2) can be cell-specific, but $P_{offset}$ may be UE-specific and/or more dynamic. As described before, PL in this equation may also be replaced by other quantities, such as RSRQ/RSRP/long-term SINR, and the like.

A HetNet may have cells with different transmission powers and may also have different frequencies/carriers, and various cell/carrier selection biases may be used, which may make TRS power control more challenging. For example, a UE may be in a network with all neighboring small cells are turned off and thus the UE sees only macro cells. The UE may have a macro cell pathloss value (e.g. PL1) measured. If the UE transmits TRS with a power determined by PL1, the TRS may be very strong and many turned-off small cells in the macro area will receive TRS. In such a situation, the network may not be able to accurately determine which small cells should be turned on. The UE may apply a scaling value $\alpha$ and $P_O$ specifically for TRS which can help reduce the TRS power, but the resulting power level may still not be appropriate. For example, if the small cells transmit at a very low power level, or a very small handover bias towards the small cells is to be used, the TRS power should be low; otherwise it may be higher. The following equation may be used to account for the transmit power differences between different types of cells or layers/frequencies as well as the cell selection biases:

$$P_{TRS}=\min\{P_{CMAX}, P_O+\alpha\cdot PL_2\}[dBm] \qquad \text{(Eq. 3)}$$

where $PL_2=PL_1+(P_2-P_1+B_{12})$, $PL_2$ is an effective pathloss related to an unseen cell that has a transmission power (when turned on) being $P_2$ and a cell selection bias $B_{12}$, $PL_1$ is the measured pathloss related to a current serving cell with a transmission power being $P_1$, and $\alpha$ and $P_O$ may be TRS specific. This equation may be used in combination with other embodiments. This equation implies that, if the turned-off cells have much lower power than the serving cells, and/or if the turned-off cells have smaller biases, then the TRS transmission power should be lower since the turned-off cells' coverage ranges are smaller. Even if higher TRS power is used to turn on these cells, these cells will not be likely to be a serving cell for the UE given their low transmission powers and low cell selection biases and hence it is desired that they are not triggered by TRS. The pathloss offset, namely $(P_2-P_1+B_{12})$, or its equivalent form such as $(P_2+B_{12})$, may be obtained by the network and signaled to the UE. In case of multiple levels of $(P_2+B_{12})$ exist (i.e., turned-off cells with different powers/biases exist), the largest may be signaled, or the network may coordinate so that multiple TRSs are transmitted by a UE with different offsets. This may also be extended to cases where the offset may be computed by the UE based on already-signaled parameters, such as inter-frequency cell selection bias, p-Max, q-OffsetCell, q-OffsetFreq, and the like. For example, the offset may not be signaled to the UE but is computed by the UE using parameters related to cell selection/reselection. The general principle for applying such biases in TRS power setting is to ensure that a potential candidate turned-off cell can receive the TRS with an appropriate received power level (i.e., not too high or not too low). In another embodiment is that, if $PL_2$ and/or $P_{TRS}$ is lower than a pathloss threshold and/or a TRS power threshold signaled by the network, the UE may not transmit the TRS. The thresholds may be UE specific or cell specific or UE group specific. This should be applicable to other embodiments in this application with only slight modifications. A UE may also be instructed to transmit TRS on a specified carrier selected by the network, and an appropriate offset may be applied according to the power level differences, etc. between the specified carrier and the UE's PCell.

For each UE, the TRS can span one or more REs over one or more component carriers, or one or more RBs (or sets of time/frequency resources) over one or more component carriers, and a UE may be assigned with REs/RBs overlapping with other UEs' TRS REs. A UE with higher pathloss to its serving point, or with higher traffic load, can be assigned with more TRS REs in time and frequency. That is, the higher the desire to offload a UE, the more TRS resources (in terms of power, spatial, code, time, and/or frequency resources) may be assigned to the UE for use.

UE1 may transmit its TRS based on a hopping pattern defined by the TRS transmission parameters. The purpose of hopping is to help the network point(s) distinguish the sources of TRSs, which will be discussed in more details in step 908. If UE1 with UE ID m is assigned with 6 REs (or L REs in general) for its possible TRS resource, it may transmit TRS using patterns based on equations taking account, for example, UE ID m, the slot number n within a radio frame, and a number K signaled by eNodeB1. K reflects the desire/benefit to offload this UE. For example, K<=6 which may be viewed as the number of TRSs for UE1 taking value from a given set (e.g. 1, 2, 4, 8, etc.). UE2, served by eNodeB5, may also be signaled to use the same equation as UE1 but with different parameters (e.g., different m and K). Alternatively, the hopping pattern can be designed to be cell specific, for example, including cell ID into the above TRS RE equation. Some examples may include: $RE_k=mk \bmod L$ with k=1, 2, . . . , K., $RE_k=mk+n \bmod L$, $RE_k=mp+kq+r+n \bmod L$ with p and q coprime or prime. Alternatively, equations used for PDCCH search space hashing function or REG randomization may be adopted with proper modifications, such as $K\{(Y_t) \bmod \lfloor L/K \rfloor\}+k$, $K\{(Y_t+k) \bmod \lfloor L/K \rfloor\}$, $Y_t=AY_{t-1} \bmod D$, $Y_{-1}=n_{RNTI} \neq 0$, A=39827, D=65537 and $k=\lfloor n_s/2 \rfloor$, $n_s$ is the slot number within a radio frame. The cell ID may also be added to the equations on top of k or m. Finally, carrier indicator may also be included similar to PDCCH hashing.

Figure 11:
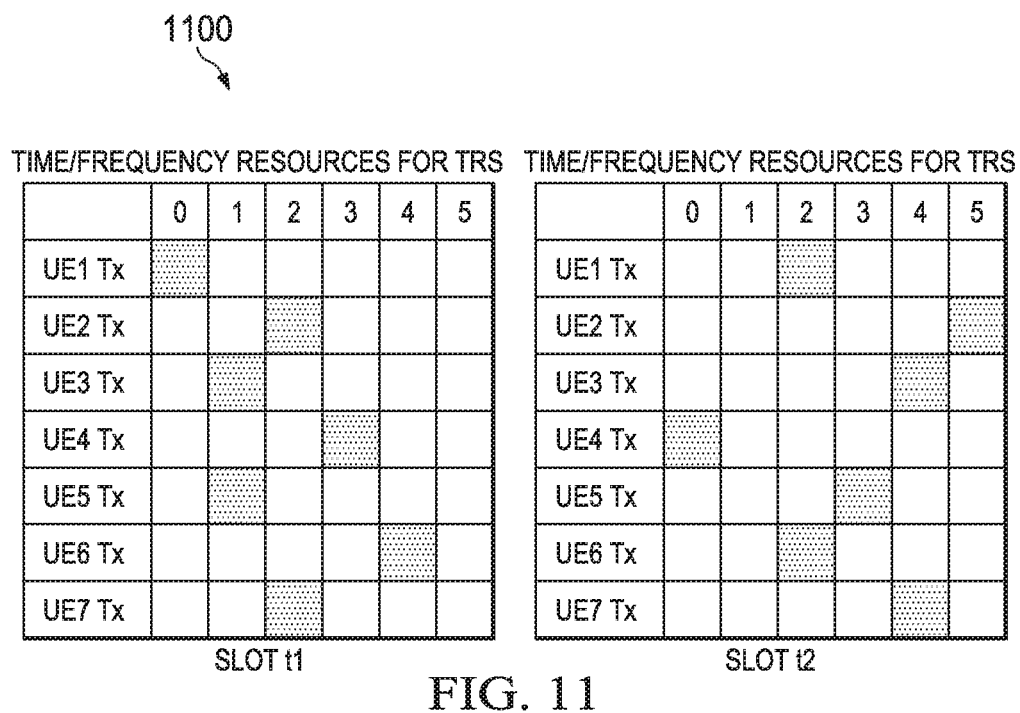
FIG. 11 illustrates an example of a hopping pattern.

FIG. 11 illustrates a hopping pattern 1100 example where different UEs transmit TRSs at different REs on the resources allocated for TRS, and the patterns change over time. The time/frequency resources assigned for TRS may be a set of REs or a set of RBs and so on.

One or more non-hopped zero-power TRSs may be used for all UEs transmitting TRSs. In other words, on some fixed REs, no UEs transmit anything. Therefore, the network points/cells can determine the background noise plus interference levels, which would be useful for the network to determine the transition.

It should be noted that the TRS is generally not assumed/intended to reach a target known to the transmitting UE, and is generally modulated with the same sequences for different UEs so that the TRSs from different UEs can be soft combined at the receiver side for power detection. In contrast, existing UL signals such as PUSCH, PUCCH, SRS, UL DMRS, RACH, etc., are generally transmitted with an assumed/intended target, and they are generally modulated with different sequences for different UEs/channels. However, the existing UL signals may be appropriately modified, extended, and/or enhanced to have similar characteristic as the TRS and achieve a similar effect as the TRS. The network may configure a target virtual cell (e.g., by providing the UE with a VCID) and a reference serving cell (e.g., by identifying serving cell having a QCL relationship with the target virtual cell) for TRS transmissions to an unknown target.

Referring back to FIG. 9, in step 906, a second eNodeB receives of the TRS transmitted by the UE. The second eNodeB may be the same eNodeB as the first eNodeB, or may be a different eNodeB assigned by the network to receive TRS. A network point in a second eNodeB may receive the superposition of the hopped TRSs over a number of REs. Further processing will be performed so that a transition decision can be made. For example, point2 of eNodeB2, point3 of eNodeB4, and/or point1 or eNodeB receive the TRS. In general, the point(s) receiving the TRS may or may not include point1, which signaled UE1 to transmit the TRS. The point(s) receiving the TRS may or may not include a point (e.g., point3), which may activated at the end of process flow 900. Further, the point(s) receiving the TRS may or may not include a point controlled by an eNodeB (e.g., eNodeB3) making a decision for adaptation/transition. Therefore, X2/S1 signaling may be used to communicate which point of which eNodeB receives the TRS.

In step 908, a network entity, e.g., a third eNodeB or a MME (mobility management entity), makes a decision for transmission or reception on a fourth eNodeB, for example, the possible adaptation of transmission and reception on the fourth eNodeB. If the network entity is a MME, the second eNodeB may transfer information of the received TRS signal to the MME. If the network entity is a third eNodeB, it may or may not be the same eNodeB as the second eNodeB which received the TRS. Thus, the second eNodeB may transfer information of the received signal to the third eNodeB. If the network entity is a MME, the MME may inform the fourth eNodeB the decision. If the network entity is a third eNodeB, the fourth eNodeB may or may not be the third eNodeB. Thus, third eNodeB may inform the fourth eNodeB the decision.

In step 908, the possible decision on the transition/adaptation may include turning on/off (e.g., transitioning the fourth eNodeB or a point controlled by the fourth eNodeB from a reduced activity mode to a data Tx/Rx mode) or modifying current transmissions or reception, such as, modifying antenna sets for transmissions or reception, channels for transmissions or reception (e.g., PDSCH, CRS, CSI-RS), component carrier sets or frequencies for transmissions or receptions, parameters for transmissions or receptions (e.g., Tx power), and so on. Furthermore, if the decision for the fourth eNodeB is not to transition or change its current operating mode, the decision maker may not need to inform the fourth eNodeB of the decisions. That is, only changes to the fourth eNodeB's operations may be signaled.

As a specific example, referring again to FIG. 10, a network entity (e.g., MME1/eNodeB3) determines if a point3 controlled by an eNodeB4 should transition to an active Tx/Rx mode or to a reduced activity mode based on a set of transition criteria applied to certain transition metrics. The transition metrics are calculated by the network entity based on aggregated received TRS signal levels/distributions, which reflects the degree of demands/benefits to add point3 into the serving pool of certain UEs (e.g., UE1 and UE2).

If the network entity is MME1, then eNodeB2 may transmit information of the received TRS signal to the MME via S1 interface. If the network entity is eNodeB3, it may or may not be eNodeB2 which performs the receiving. If eNodeB3 is different from eNodeB2, then eNodeB2 may transmit information of the received TRS signal to eNodeB3 via X2/S1 interface. In either case, the information sent from eNodeB2 may be the received TRS signal with or without processing. Furthermore, eNodeB4 may or may not be eNodeB3 if eNodeB3 is the decision-making network entity. If eNodeB4 is different from eNodeB3, eNodeB3 may inform eNodeB4 the decision. If, however, MME1 is the one making the transition decision, MME1 may inform eNodeB4 the decision.

The decision is based on transition metrics generated from the received TRS signal. The metrics may be generated from the received TRS signal directly (e.g., without eNodeB2 processing/compressing, etc.), or the metrics may be generated from the received TRS signal indirectly (e.g., with eNodeB2 processing/compressing followed by forwarding to MME1/eNodeB3, and MME1/eNodeB3 performing further processing and/or decision making). The factors impacting the transition metrics include, e.g., the number of UEs sending the special physical signals, the pathloss between the UEs and the monitoring network point, the traffic loads of UEs, the Tx power and number of UEs' TRSs, and the like.

The transition criteria are then applied to transition the metrics for the transition decision making. The transition criteria may reflect cost/complexity of transition, such as, signaling complexity/latency to turn on the transmission and reception of point3, whether point3 and eNodeB4 belong to the same operator as point1 and eNodeB1, and the like. Hopping patterns are configured for the UEs sending TRS (e.g., see FIG. 11), and these hopping patterns may affect the received TRS signal and the corresponding transition metrics. These hopping patterns may be utilized to help the network distinguish the sources of TRSs and make better decision on adaptation/transition. If there is no hopping used and all the UEs transmitting TRSs on the same REs, the receiver may not be able to distinguish if there is one dominant UE sending the TRS or multiple UEs sending the TRSs because the received superposition of the TRSs may be the same in either case. Therefore, the network may configure a UE specific hopping pattern, and different UEs may send their TRSs on possibly different REs in a rather randomized manner. If the superposition of the received TRS signal distributes in a relatively more uniform fashion from one RE to another and/or from one slot to another, then it is more likely that multiple sources sending TRSs are within the range of point2. If, on the other hand, the superposition distributes with relatively larger variations from one RE to another and/or from one subframe to another, then it is more likely that one or a few dominant sources sending TRSs are nearby.

In cases with multiple sources sending TRSs may imply a more reliable request/demand/benefit for point3 to turn on, whereas the case with only one dominant source nearby generally may not lead to such an implication. For this reason, if the network configures only UE1 to transmit TRS but both UE1 and UE2 are desired to seek alternative serving points, the network may configure UE1 to transmit two TRSs (e.g., setting K=2 in Eq. (3)) instead of only one TRS with higher power so that the received TRSs are more similar to those from multiple sources.

Figure 12:
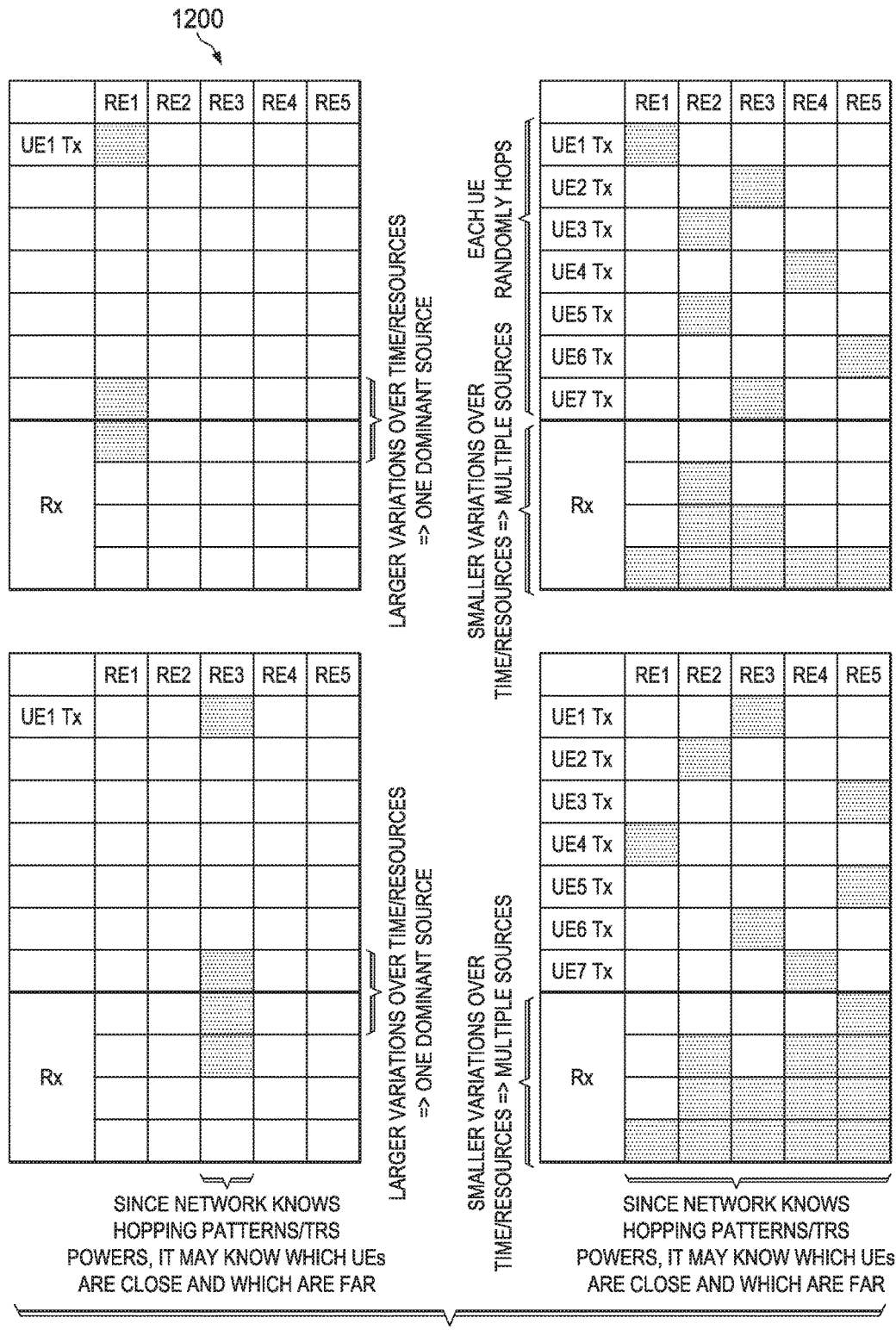
FIG. 12 illustrates a hopping pattern for TRSs.

FIG. 12 illustrates a hopping pattern 1200 for TRSs (note that the amplitudes on Tx side and Rx side are plotted in different scales).

Figure 13:
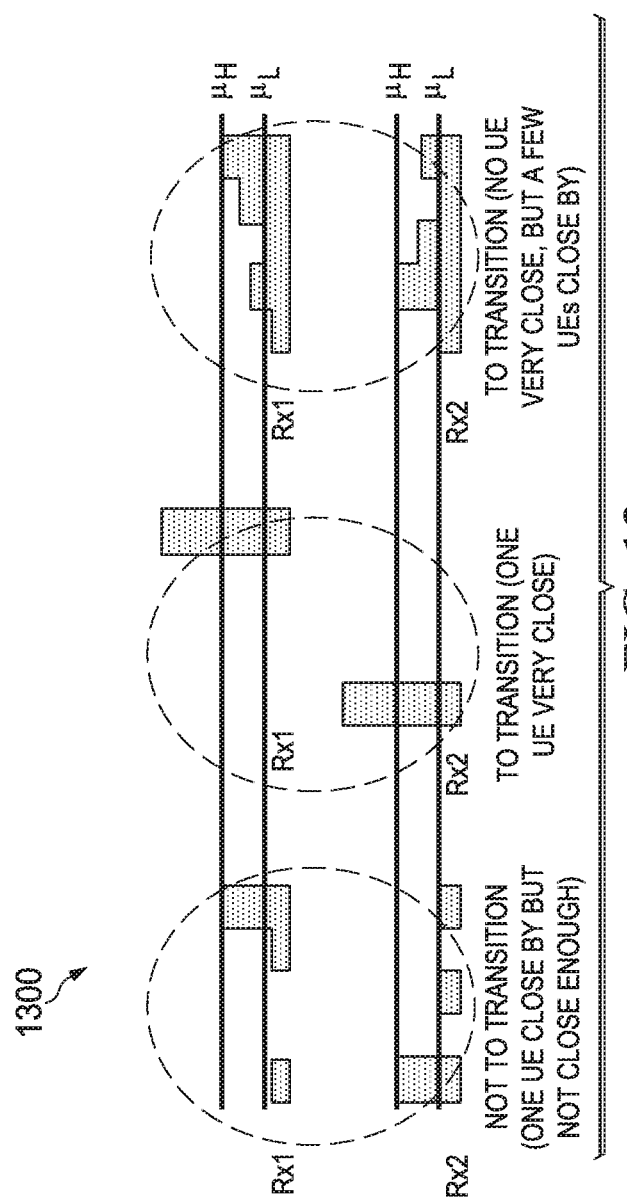
FIG. 13 illustrates examples of transitions and of no transitions.

As a specific example of determining the transition, eNodeB2 or MME1/eNodeB3 computes the means $\mu_i$ and variations $\sigma_i$ (e.g., variances, or max-min) for each received sets of TRSs. Then MME1/eNodeB3 compares against thresholds $\mu_L$, $\mu_H$, and $\sigma$. If $((\mu_i>\mu_L)$ & $\&(\sigma_i<\sigma))\|(\mu_i>\mu_H)$, then a transition decision is made. The thresholds can be determined from the received non-hopped zero-power TRSs which indicated the levels and variations of the background noise plus interference. The frequency of transmissions may need to be limited to prevent on/off oscillations. Some examples 1300 of transitions and no transitions are shown in FIG. 13.

It may be beneficial for eNodeB1 to transmit UE1's TRS configuration information to MME1/eNodeB3 to assist MME1/eNodeB3 to make a decision. The configuration information may include UE1's TRS transmission as configured by eNodeB1, TRS RE/RB information and hopping pattern, TRS periodicity, and so on. In this case, MME1/eNodeB3 may have both the transmitter side information about the TRS transmissions and the receiver side information about the TRS transmissions, thus increasing the likelihood of making a more reliable decision on transition/adaptation. The configuration information may be sent via S1/X2 interface. In case that eNodeB1 is the same eNodeB as eNodeB3, no S1/X2 signals are needed.

One issue related to the network making a transition decision is that, if more than one cell receives strong TRS signals, should all those cells be turned on. In some cases, the TRS signals received at different cells may correspond to the same set of UEs and it is possible that only one cell should be turned on. In some other cases, the TRS signals received at different cells may correspond to different sets of UEs and it may be desired that all such cells should be turned on. In still other cases, the TRS signals are from different sets of UEs with some overlap. One way to help the network make a reliable decision is to allow UEs to transmit TRS with UE-specific resources, such as UE-specific sequences and/or UE-specific time/frequency resources. However, using UE-specific sequences may lead to significant complexity for the network to descramble TRS signals because the network entity receiving the TRSs may not be aware of the source UEs transmitting such signals. Therefore, UE-group-specific sequences (e.g. cell-specific sequences) may be more practical than UE-specific sequences. On the other hand, even with the same sequence in the network, the network may calculate received TRS correlations across different cells and/or different TRS instances to help identify if the sources are highly correlated or not. If the TRS correlations are high, then it is likely that the sources are somewhat the same and the decision may be only one small cell should be turned on. Otherwise, it may indicate that the sources are quite different and more than one small cell may be turned on.

Referring back to FIG. 9, in step 910, the fourth eNodeB transmits or receives a signal in accordance with the decision by the network entity in step 908. Transmitting/receiving signals may include the fourth eNodeB doing nothing or remaining in a reduced activity mode. For example, if MME1/eNodeB3 decides not to transition point3 of eNodeB4, then the network goes back to the state before the probing period.

If a transition decision is made, then several operations may be needed. Active Tx/Rx of data usually involves at least the transmission of CRS/CSI-RS, so point3 may start to transmit CRS/CSI-RS based on eNodeB4's indication. Additionally, this decision may be sent to other eNodeBs by MME1/eNodeB3 and/or eNodeB4. Subsequently, these eNodeBs may configure served UEs to receive CRS/CSI-RS from point3.

Alternatively, point3 may transmit DRS for a short period of time and UEs are configured to make measurements based on DRS. DRS may be generally not used for or associated with data transmission but only for cell discovery/cell activation purposes, and the measurement feedback data may be used by the network to make more accurate decision on whether point3 should be activated to transmit CRS/CSI-RS associated with or used for data transmissions. In other words, the network requests UEs to transmit TRS according to traffic and channel qualities and so on, and the TRS in UL may be used to activate DRS transmission in DL from a set of cells. Based on received DRS based measurements (e.g., made by a UE), and the network makes a reliable transition decision. Note that DRS may not be desired to transmit periodically from all cells that are turned off, since long periodic transmissions imply less flexibility and the short period implies high overhead; therefore a trigger for DRS may be used, such as TRS. Alternatively, DRS transmissions may be periodic.

UE1 and/or UE2 (and/or UE3 and so on) receiving CRS/CSI-RS from point3 may report the channel status to point3, and the network may decide to let point3 to serve some of the UEs. Handover may or may not be needed. CoMP Scenario 4 (Shared Cell ID) concepts may be used. For example, UE1 and/or UE2 (and/or UE3 and so on) may start to receive PDSCH from point3 but there may not be cell-level handover from, say eNodeB1 to eNodeB4 (e.g., and those UEs may still receive e.g., PDCCH from their original serving points).

The number of antenna ports, antenna configurations may be different after the transition. Therefore, measurements/codebook/feedback may need to be reconfigured. Relevant reconfiguration signals may need to be sent in order to complete the transition. As soon as a transition decision is made, the network can start the follow-up (aftermath) procedures such as reconfiguring CSI-RS patterns, UE measurements, codebooks, etc. Additionally, the network may even prepare relevant points at the same time for the follow-up procedures to further reduce turnaround time.

Although the above examples are primarily focused on the case of increasing the activities of a network point, embodiments are by no means so limited. The possible actions that the network may take include: start/stop transmitting certain channels such as DL CRS/CSI-RS, PUSCH, PDSCH; change transmission power levels such as increasing or decreasing power, including turning on/off the node transmission; change cell configurations such as including/excluding some network points within a shared cell-ID area; change antenna configurations such as including/excluding some network point antennas; change UL/DL configuration in TDD systems; and so forth.

In an embodiment Tx method, a UE transmits a UL physical signal (TRS), and an eNodeB decides to transmit DL RS based on the received UL physical signal. The UL physical signals may be transmitted on a set of REs, and a second UE may transmit the same UL physical signal on the set of REs. For example, one or more UEs transmit a UL physical signal, and an eNodeB may decide to transmit a signal associated with an updated configuration based on the received UL physical signal. In an embodiment Rx method, an eNodeB receives a UL physical signal, and the eNodeB determines whether to transmit DL RS based on the statistics of the received UL physical signal. In another embodiment, an eNodeB receives a UL physical signal, and the eNodeB determines whether to transmit a signal associated with an updated configuration based on the statistics of the received UL physical signal.

In an embodiment of signaling a threshold for a measurement quantity to a UE, the UE transmits a UL physical signal (e.g., TRS) if the measurement quantity of the UE is greater than the threshold. A same or different threshold may be signaled to a second UE The measurement quantity may be a pathloss, RSRP, RSRQ, CQI, etc.

In an embodiment of signaling a threshold for a measurement quantity to a UE, the UE transmits a UL feedback signal of whether the measurement quantity of the UE is greater than the threshold. Using the UL feedback signal, an eNodeB determines whether to trigger a UL physical signal and/or signal resource allocation for the UL physical signal to the UE. The UE may transmit the UL physical signal (if so triggered) on the allocated resources. For example, the UE may transmit the UL physical signal with a power level determined using the parameters set by the eNodeB. As another example, the UE may determine a hopping patterning on the allocated resources for transmitting the UL physical signals. The hopping pattern may be the same hopping pattern or a different hopping pattern used by a second UE for transmitting UL physical signals. The measurement quantity may be a pathloss, RSRP, RSRQ, CQI, etc.

In an embodiment of signaling a resource set to an eNodeB, the eNodeB determines whether to transmit DL RS based on the received UL physical signal on the signaled resource set. In an embodiment of a first eNodeB signaling a configuration to a second eNodeB, the first eNodeB transmits and/or receives based on the configuration, and the second eNodeB adapts its transmissions/receptions based on the received configuration. In an embodiment of signaling a resource allocation to a UE, the UE receives a UL physical signal on the allocated resource, and the UE signals the statistics of the received UL physical signal on the allocated resource to an eNodeB, and a second eNodeB signals a second UE on establishing a direct mobile connection link.

An embodiment uses RACH, SRS, or another pre-existing UL signal (either unmodified or modified version) for TRS transmissions. The triggering, sequences, and power control will be described below.

As an example, the existing RACH signal can be reused for the TRS purpose. Reusing the parts of RACH mechanism for TRS purpose may have several advantages. For instance, since the RACH signaling already exists in the standards specifications, the sequence, signaling, and timing design/processing may be largely reused for the TRS purpose. An example of such a RACH design/processing reuse can be reusing the RACH preamble sequences which the existing receivers can already process. The suitable preamble sequences can be chosen for different cell sizes. In addition, the appropriate cyclic shifts have been already analyzed for different cell sizes. Another example can be reusing the RACH triggering mechanism. Yet another example can be reusing the RACH timing, for example, when the UE transmits TRS after receiving the TRS trigger.

To trigger the TRS transmission for a set of RRC-connected UEs served by different cells, PDCCH order can be utilized. In the existing specifications, if DCI 1A is transmitted in (E)PDCCH and its CRC is scrambled with the cell radio network temporary identifier (C-RNTI) of that UE then the UE decodes the PDCCH order. PDCCH order can be used to trigger contention-free RACH transmission and includes a 6-bit RACH preamble index as well as a 4-bit PRACH mask index. The mask index is used to identify which PRACH resources, out of the ones indicated by PRACH configuration, the UE is allowed to use for RACH operation.

There are several to reuse PDCCH order for TRS triggering purpose while helping UEs to distinguish between PDCCH order used to trigger TRS from other (E)PDCCH messages.

A first alternative includes scrambling the CRC of PDCCH order used for triggering TRS transmission with a different RNTI than C_RNTI, which can be a new RNTI or an existing RNTI. The RNTI chosen for TRS triggering purpose may be used for a group of UEs and the PDCCH order can be signaled in common search space. The RNTI chosen for TRS triggering purpose may enable UEs to monitor the (E)PDCCH for TRS triggering once every "m" subframes, where "m" may be greater than one. The value of "m" might also be configured by the network. The value of the new RNTI can be chosen from the reserved RNTI values FFF4-FFFC (provided in Table 7.1-1 of 3GPP TS 36.321, reproduced on the subsequent page). Existing RNTIs may also be reused for the decoding the PDCCH order.

TABLE 7.1-1

| Value (hexadecimal) | RNTI |
| --- | --- |
| 0000 | N/A |
| 0001-003C | RA-RNTI, C-RNTI, Semi-Persistent Scheduling C-RNTI, Temporary C-RNTI, TPC-PUCCH-RNTI and TPC-PUSCH-RNTI (see note) |
| 003D-FFF3 | C-RNTI, Semi-Persistent Scheduling C-RNTI, Temporary C-RNTI, TPC-PUCCH-RNTI and TPC-PUSCH-RNTI |
| FFF4-FFFC | Reserved for future use |
| FFFD | M-RNTI |
| FFFE | P-RNTI |
| FFFF | SI-RNTI |

The Random Access RNTI(RA-RNTI) may also be used for TRS triggering purposes as discussed above. RA-RNTI identifies the time-frequency resource utilized by the UE to transmit the Random Access preamble. In some embodiments, RA-RNTI may equal 1+t_id+10*f_id. Where t_id is the index of the first subframe of the specified PRACH ($0 \leq t\_id < 10$), and f_id is the index of the specified PRACH within that subframe in ascending order of frequency domain ($0 \leq f\_id < 6$). So UEs, capable of TRS transmision, that have performed their RACH operation on the same t_id and f_id opportunities can be triggered for TRS transmission via PDCCH order scrambled by such RNTI. To avoid any confusion in the RACH operation of the legacy UEs which are not capable of TRS transmission, the preamble sequence index used in TRS PDCCH order (PDCCH order to trigger TRS) can be different from the preamble sequence indices used for RACH operation.

The system information RNTI (SI-RNTI) may also be used for TRS triggering purpose discussed above as the SI-RNTI value is always "FFFF" and is neither UE nor cell specific. To help UE distinguish whether the existing RNTI reused for TRS trigger purpose or it is used for its original purpose, the TRS-capable UE may look for specific physical random access channel (PRACH) mask index(ices) and/or RACH preamble sequence(s) configured for TRS transmission.

If necessary, the network may avoid using the messages creating the same data fields as the PDCCH order used for TRS trigger in the PDCCH scrambled by the reused RNTI for its original purpose (e.g., PDCCH containing information regarding system information). For example, if the to bits used to indicate preamble sequence and PRACH mask index have the value denoted by a1, . . . , a10, the network may not use the same bit values in the PDCCH scrambled by the reused RNTI for its original purpose.

A second alternative to reuse PDCCH for TRS triggering includes scrambling the CRC of PDCCH order used for triggering TRS transmission with the C-RNTI. To enable a UE (capable of TRS transmission) to distinguish PDCCH orders targeted for TRS and for RACH, The network/each cell may allocate non-overlapping subsets of RACH preamble sequences for the purposes of TRS and RACH operations. In such embodiments, the subset of preamble sequences is revealed to UEs capable of TRS transmissions, for example, by means of RRC signaling. When the network/each cell wants to trigger TRS transmission, it transmits PDCCH order containing a sequence index belonging to the indices corresponding to the subset dedicated for TRS transmission. Alternatively, the network/each cell may use one of the reserved PRACH mask indices (e.g., as indicated in 3GPP TS 36.321, Table 7.3-1). In such embodiments, using a reserved PRACH mask index to indicate TRS trigger can be configured by network to UE signaling (e.g., by RRC signaling). In yet another alternative, a new DCI format may be used for the purpose of TRS triggering. One or more of the various alternatives presented above (e.g., allocating non-overlapping subsets of RACH preamble sequences, using reserved PRACH mask indices, and a new DCI format) may be used in combination for TRS triggering.

The PRACH and TRS resources (e.g., time/frequency) can be non-overlapping. For example, a set of TRS time/frequency resources can be used for UEs served by all or a portion of active small cells. The set of TRS time/frequency resources may not overlap with RACH resources. The set of TRS time/frequency resources can be signaled to UEs, for example, by RRC signaling. Alternatively, the PRACH and TRS resources may be the same/partially overlapping. In such embodiments, to mitigate the interference between RACH and TRS transmissions, different sequences can be used for RACH and TRS operation.

In an embodiment, the RACH preamble sequence can be used as a TRS signal. The preamble sequence format can be different for RACH and TRS purposes. As an example, in an FDD system, the RACH preamble format can be 1-3 (e.g., as specified by 3GPP TS 36.211), while the TRS preamble format can be 4 originally used for TDD systems. The TRS preamble format can be signaled to UE via RRC signaling as an example.

To help the network point(s) distinguish the sources of TRSs, each UE triggered for TRS transmission can apply a cyclic shift offset to the TRS sequence (e.g., RACH preamble sequence with sequence index indicated by PDCCH order). The cyclic shift offset may be pseudo random or a function of its UE-ID and/or cell-ID. Some of the parameters of the pseudo random generator/function assigning a cyclic shift to a UE transmitting TRS can also be signaled by the network, for example, via RRC signaling. An example of such network signaling can be controlling the set of resulting sequences (i.e., TRS sequences transmitted by UEs as a result of applying cyclic shifts on the sequence provided by PDCCH order). Assuming the size of the cyclic shift set, UE-ID and cell-ID are respectively $CS_{TRS}$ (which is signaled by the network), $u_{id}$, and $c_{id}$, an example of the hopping function $f$ can be the following:

$$f = \left(\frac{c_{id}}{a} + \frac{u_{id}}{b}\right) \bmod CS_{TRS},$$

where a and b are parameters that can be specified in the standard or configured/signaled to UEs. Depending on the values of parameters a and b, the cyclic shift offsets for UEs belonging to the same serving cell is the close to or far apart from each other. A group-cell-ID can be assigned to a group of near-by cells and used instead of $c_{id}$ in the function.

In 3GPP TS 36.213, RACH power control takes the following form: The setting of the UE transmit power $P_{PRACH}$ for the RACH preamble sequence transmitted on subframe i for serving cell c is defined by $P_{PRACH}=\min\{P_{CMAX,c}(i),\text{PREAMBLE\_RECEIVED\_}$
$\text{TARGET\_POWER}+PL_c\}\_[dBm]$ where $P_{CMAX,c}(i)$ is the configured UE transmit power defined in [36.101] in subframe i for serving cell c.

$PL_c$ is the downlink pathloss estimate calculated in the UE for serving cell c.

PREAMBLE_RECEIVED_TARGET_POWER is the target preamble received power indicated by higher layers.

The PREAMBLE_RECEIVED_TARGET_POWER is set according to [36.321], and can be changed from one preamble transmission to another if the eNodeB has configured preamble power ramping to increase the power of preamble, each time it is being sent, by a fixed step as described in [36.321].

Some of the RACH power control mechanism parameters are cell specific and others are UE specific. An embodiment is to include a different set of parameter values for TRS, parallel to current, normal RACH setting. For example, PREAMBLE_RECEIVED_TARGET_POWER may account for the network side input to the TRS transmit power of the UE triggered for TRS. This parameter for TRS power control can be signaled by RRC signaling as an example.

The RACH power ramping feature may be useful for TRS power control. As an example, in cases where some UEs that were triggered for TRS transmission have not seen any change in the network after a while from their TRS transmission, such UEs may be instructed/configured by the network to increase their TRS power to reach additional reduced activity mode points (e.g., reduced activity mode points which are potentially located farther away). As another example, the network may want to reduce the TRS power for some UEs when the network has found more than one suitable reduced activity point has detected some TRS signals. To be able to decide which reduced activity point should be transitioned to an active point, the network may reduce TRS power for some triggered UEs.

The TRS power can be adjusted in several ways. In some embodiments, PDCCH order can be used for this purpose. One way to adjust the TRS power is to send a second PDCCH order shortly after sending the first PDCCH order. If a UE triggered for TRS receives the TRS trigger message again within a fraction of time after getting the first TRS trigger, it can ramp its power up based on the parameter powerRampingStep signaled by RRC signaling. Another way to adjust the TRS power is to use the 4-bit "PRACH Mask Index" field in the PDCCH order to either signal TRS power ramp up/down or the new TRS power from the network perspective.

If TRS and other UL signals (such as PUSCH, PUCCH, and the like) are allowed to be transmitted by a UE in the same subframe, the power control rule should account for such a simultaneous transmission by properly scaling the power down. UL channels may be prioritized for transmission in such a case. Power scaling rules and priorities defined in existing specifications for interband UL CA maybe reused with some modifications.

In case a UE is triggered for TRS transmission corresponding to a specific component carrier (referred to as the target carrier) and the UE has more than one active component carrier, the TRS transmission may be on the UE's primary component carrier (PCell). Such an approach may be a good when there is limited or no carrier aggregation capability in the uplink. The PCell is UE-specific and might be different from one UE to another. In such a case, the TRS can convey the target carrier information to the network point(s). The information can be embedded into TRS resources such as time/frequency/code. As an example, different set of cyclic shifts can be used to indicate different component carriers.

In some alternative embodiments, SRS or a modified version may be used for TRS transmission. The power control, triggering, and sequences will be described below. Note that some of the embodiments may be used in combinations with embodiments described above (e.g., with regards to RACH-based TRS transmissions).

In 3GPP TS 36.213, SRS power control takes the following form: a setting of the UE Transmit power $P_{SRS}$ for the Sounding Reference Symbol transmitted on subframe i for serving cell c is defined by $P_{SRS,c}(i)=\min\{P_{CMAX,c}(i),P_{SRS\_OFFSET,c}(m)+10\log_{10}$
$(M_{SRS,c})+P_{O\_PUSCH,c}(j)+\alpha_c(j)\cdot PL_c+f_c(i)\}[dBm]$ where $P_{CMAX,c}(i)$ is the configured UE transmit power defined in subframe i for serving cell c.

$P_{SRS\_OFFSET,c}(m)$ is semi-statically configured by higher layers for m=0 and m=1 for serving cell c. For SRS transmission given trigger type 0 then m=0 and for SRS transmission given trigger type 1 then m=1.

$M_{SRS,c}$ is the bandwidth of the SRS transmission in subframe i for serving cell c expressed in number of resource blocks.

$f_c(i)$ is the current PUSCH power control adjustment state for serving cell c, see Section 5.1.1.1 of 3GPP TS 36.213.

$P_{O\_PUSCH,c}(j)$ and $\alpha_c(j)$ are parameters as defined in Section 5.1.1.1 of 3GPP TS 36.213, where j=1.

Some of these parameters are cell specific and others are UE specific. It can be seen that SRS power is tied to PUSCH power (i.e. data transmission power). Therefore, simply changing some parameters here for TRS purposes may significantly affect normal SRS and PUSCH transmissions. An embodiment includes a different set of parameter values for TRS transmissions, in addition to current, normal SRS settings. In such embodiments, it may be desirable to reuse as many normal SRS parameter values as possible.

For example, there may be only another value of $P_{SRS\_OFFSET,c}(m)$ added for TRS, and this value may reflect the network's desire for some turned-off cells to be turned on. Other values such as $\alpha_c(j)$ may be common to TRS/SRS. For example, the pathloss $PL_c$ is the one for a serving cell, which may be viewed as a partial indicator of the service quality of the UE by that serving cell. Therefore it may be desired to use high TRS power for a high $PL_c$ serving cells.

For another example, there may be another value of $P_{SRS\_OFFSET,c}(m)$ and $\alpha_c(j)$ added for TRS. The reason for adding another $\alpha_c(j)$ may be seen from the following example case: serving cell c may be a macro cell, and the UE may be a few hundred meters away from the cell. Thus, the pathloss $PL_c$ may be quite large. Such $PL_c$ may not be suitable for small cells close to the UE to receive TRS transmission because it may lead to very high power TRS. In some cases such a high powered TRS may even mask many neighboring small cells' reception. This problem may be partially remedied by properly setting $P_{SRS\_OFFSET,c}(m)$, but a better approach may be to let TRS utilize the $PL_c$ in a way different from how SRS utilizes the $PL_c$. Thus, a smaller $\alpha_c(j)$ may be used. Such a smaller $\alpha_c(j)$ may be signaled to the UE, or may be derived by the UE based on the $\alpha_c(j)$ used for normal SRS. For example, $\alpha_{SRS}(j)=d\alpha_c(j)$, where d is a discount factor configured for the UE, taking value, e.g. 0.5. One embodiment is that d=0, namely the TRS power is not based on a serving cell power.

For another example, a different $M_{SRS,c}$ may be configured, so that TRS can be transmitted with different bandwidth than SRS. For another example, a different $f_c(i)$ may be configured, so that TRS can have a different power control adjustment than SRS/PUSCH. For yet another example, a different m value may be configured or another possible value of m is included in the standards. Thus, another trigger type may be supported. For example, m=2 may be allowed. The UE understands that if m=2 is received, then TRS, instead of normal SRS will be transmitted. To further differentiate periodic/aperiodic TRS, m=2 and m=3 may be added. In such embodiments, 2 bit SRS request (or rather SRS/TRS request) in related DCI formats will be used. For yet another example, a different j value may be configured, or another possible value of j is included in the standards.

The network may request one SRS transmission from a UE or configure periodic SRS transmissions until terminated. TRS may be dealt with similarly, in a way such that the TRS trigger or configuration can be distinguished from normal SRS by the UE. For example, another set of configurations and an indicator to help the UE distinguish those configured for TRS and those configured for SRS may be added. For example, in the DCI format containing SRS request, another bit may be added so that the UE may know if a SRS request is triggering a SRS or TRS transmission. Such an indicator may also be included in SIB and handover messaging.

What may differentiate TRS/SRS may include if the associated transmissions are UE specific or common to multiple UEs. SRS is generally intended to be UE specific, namely different UEs (in the same cell or in different cells) may use different time/frequency/sequence/cyclic shift configurations, whereas TRS may share many common configurations. Therefore, many UEs may be triggered at the same time to use the same resources. The trigger can be thus combined as a common/group trigger, which can help reduce overhead. An embodiment for achieving this purpose is to use (E)PDCCH which may require modifying (E)PDCCH/DCI formats. Some detailed embodiments follow.

Group signaling may be carried in UE-specific search space, but this may significantly increase the UE blind decoding attempts. Instead, group signaling may be carried in common search space that differs from other control channels (e.g., using different RNTIs or different DCI formats). For example, a group TRS trigger may be (partially) identified by a UE based on a distinctive RNTI. While some of the RNTIs are associated with an individual UE, other RNTIs may be reserved for group signaling such as for TRS. Such RNTIs may be called as G-RNTI. Multiple G-RNTIs may be configured for different UEs, and if a UE detects its associated G-RNTI, the UE will transmit TRS. The (E)PDCCH with a G-RNTI may indicate some TRS transmission configurations in the associated PDSCH, such as power/resources/and the like for TRS transmissions for a particular group of UEs.

Alternatively, group triggering may include reusing existing non-UE-specific RNTIs, e.g., SI-RNTI and P-RNTI. To distinguish from their legacy usage, SI-RNTI (and P-RNTI, resp.) may be used in a subframe not intended to contain system information (and paging, respectively). This may be done by, e.g., using a different subframe offset for TRS triggering. The channels indicated by such (E)PDCCH may also need to be modified. For example, the paging channel may now contain a list of UE IDs who are intended to transmit TRS according to configured configurations. Alternatively, SI-RNTI (and P-RNTI, respectively) for TRS may be used in a subframe that legacy UEs monitor for SI-RNTI (and P-RNTI, respectively), but then the associated PDSCH contents may need to append TRS related information which does not affect the UEs' non-TRS related operations. A benefit of doing so is that even idle UEs can be triggered to transmit TRS if needed. In general this may not be needed or useful for idle UEs to transmit TRS since idle UEs generally do not have traffic. However, idle UE TRS transmission may be preferred in some situations where that the network desires to find out the potential traffic demands from all UEs, including idle ones. If P-RNTI is used, the network can sample some UEs (including some idle ones) to find out the potential traffic demands. Note that P-RNTI based transmissions are coordinated across multiple cells, which may be useful for triggering UEs from multiple cells. On the other hand, SI-RNTI based transmissions are generally cell specific, so multiple cell coordination may be needed if TRS trigger is carried with SI-RNTI.

In various embodiments, the same resources may be used for TRS. If SRS is reused/modified for TRS purposes, another set of resource configurations may be added for TRS; otherwise neither TRS nor SRS may work well. Embodiments bearing the same principle as described above may be provided. However, hopping for aperiodic transmission of TRS may need to be supported. Note that the proposed hopping of SRS may include hopping on resources according to UE IDs and/or hopping of cyclic shifts according to UE IDs.

In an embodiment, a different serving cell c value (as used in 3GPP TS36.213) may be configured for TRS. For example, a target virtual cell may be defined by TRS transmission parameters and may be used as a target receiving cell for UE TRS transmission purposes. A set of power control parameters (and other relevant configurations) are configured for the target virtual cell, including, e.g., $P_{CMAX,c}(i)$, $P_{SRS\_OFFSET,c}(m)$, $M_{SRS,c}$, $f_c(i)$, $P_{O\_PUSCH,c}(j)$, $\alpha_c(j)$, and so on. Some of these parameters may be based on a reference serving cell specified by the network, for example, using a quasi-co-location (QCL) indication indicating a QCL relationship between the reference serving cell and the target virtual cell. A benefit of introducing such a target virtual cell is to avoid adding another set of parameter values to SRS for TRS purposes. Rather by adding another target cell for TRS purposes, the existing mechanisms may be reused as much as possible, including power control mechanisms, power adjustment mechanisms, triggering mechanisms, resource configuration mechanisms, and the like. Furthermore, few configurations are changed for the UE's normal operations relevant only to other cells.

Generally speaking, QCL relationships may identify a reference serving cell (e.g., the dormant cell, a call having similar timing characteristics as the dormant cell, and the like) that has a QCL relationship with the target dormant cell (known to the UE as the target virtual cell). Two cells (or specific antenna ports of a cell) are said to be quasi co-located if the large-scale properties of the channel over which a symbol on one cell is conveyed can be inferred from the channel over which a symbol on the cell is conveyed. The large-scale properties include one or more of delay spread, Doppler spread, Doppler shift, average gain, and average delay. These QCL relationships (e.g., between the reference serving cell and the target virtual cell) may be signaled to UEs by the network.

Because the UE is aware of the QCL relationship between the reference serving cell and the target virtual cell, the UE may use various parameters (e.g., pathloss, timing, and the like) of the reference serving cell for TRS transmissions to the target virtual cell. For example, the UE may transmit TRS based on reference serving cell timing. For another example, the UE may transmit TRS based on reference serving cell pathloss. In general, there are cases where the reference serving cell timing and target virtual cell timing are not fully aligned, and small timing adjustments may be done (described below) or a timing offset (such as a fixed amount of timing, a fixed amount of sample durations, a fixed amount of symbol durations, etc.) between the reference serving cell timing and target virtual cell timing may be signaled to the UE. There are also cases where the reference serving cell pathloss and target virtual cell pathloss are not equal, and a frequency-dependent offset may be applied, or the network signals such an offset to the UE. The UE may detect these parameters of the reference serving cell, for example, by detecting and measuring RS from the reference serving cell.

The network may configure a UE with a virtual cell ID (VCID) associated with the target virtual cell. The DL monitoring of this VCID is done by the UE via a reference serving cell. That is, the UE does not need to monitor the RS associated with the signaled VCID, and the UE may monitor RS from the reference serving cell for the TRS transmission parameters. The timing associated with the VCID may be based on the reference cell. However, the timing may not be completely suitable for a dormant cell to receive, and timing adjustment can be done using existing mechanisms if needed. For example, the initial transmission by the UE may be based on the reference serving cell timing. After the dormant cell receives the TRS, it may find the TRS timing has a certain error and decides to change the timing. Then the network may indicate to the UE in downlink signaling the amount of timing adjustment the UE needs to make for the next transmission associated with the VCID. This adjustment can be constantly performed. If there is a known timing offset between the virtual cell and the reference serving cell, the timing offset may be signaled to the UE (e.g., as a timing advance for the virtual cell) to be applied for all transmissions with the virtual cell (until indicated otherwise by the network). Similarly the initial power control may be based on the reference serving cell, but further dormant-cell specific and/or UE specific power adjustment may be done. An embodiment reuses TPC-PUCCH-RNTI and/or TPC-PUSCH-RNTI to trigger TRS transmissions. These two RNTIs are used for a group of UEs, so the grouping information may be signaled to UEs to trigger multiple UEs in one or more cells.

Multiple UEs in one or more cells may be signaled with the same VCID for TRS (e.g., the target virtual cell may be common for a group of UEs), so the UEs may transmit TRS using the same sequence. The UEs may receive information/configurations (e.g., (E)PDCCH, PDSCH, and the like) masked/scrambled according to the VCID. However the transmissions of the information/configuration may be performed by the reference serving cells. QCL information may be sent to a UE to indicate that the a reference serving cell may be associated with the virtual cell, so that (E)PDCCH/PDSCH associated with the target virtual cell may use the reference serving cell's DL RS for demodulation.

The QCL information may change when the reference serving cell is changed. The configurations received by the UE may include SRS configurations (e.g., SRS is reused for TRS purposes), RACH configurations (e.g., RACH is reused for TRS purposes), and/or other configurations such as uplink DM-RS, PUCCH/PUSCH, and the like. A SRS request may be transmitted to a UE to trigger the SRS transmissions for TRS purpose. If the target virtual cell VCID is released from UE serving cell list, the UE will not transmit SRS or RACH associated with the target virtual cell (i.e. no TRS transmissions). In this manner, the network may select a portion of the UEs to transmit TRS.

A dormant cell may be configured with a VCID associated with a target virtual cell; it will then monitor SRS and/or PRACH associated with the VCID. There may be one or more VCIDs associated with target virtual cells. Such VCIDs may be configured or specified in standards. In the former case, the VCID may be chosen from existing VCIDs, but in the latter case, the VCID may be a generalized VCID which is different from any existing VCIDs. The maximum numbers of VCIDs currently supported by a UE may be increased, such as the maximum number of VCIDs for SRS, maximum number of VCIDs for DMRS, etc.

The timing of SRS adjusted to a serving cell may not work well for TRS purposes. For example, the received TRS at a turned-off cell is significantly interfered with due to a timing error. In such embodiments, a TRS may be expanded over a few (e.g. 2, 3) consecutive OFDM symbols may be transmitted, and/or guard time(s) before/after the TRS transmissions may be added and may be coordinated over a number of cells. Data transmissions by other UEs or cells may be shortened for the expanded TRS and the guard times.

Various embodiments also are related to HetNet Carrier based HetNet ICIC, another WI in RAN WG3. Various embodiments are not limited to component carrier selection. Further, in some embodiments and applications, it is possible to reuse some existing UL signals (PUSCH, PUCCH, SRS, RACH, etc.) for transition decision purposes without redefining such UL signals. These UL signals may vary significantly with scheduling/power control and cause inaccurate assessments of whether the point needs to transition, and they may have higher overhead than other embodiments described herein (e.g., SRS spans a few PRBs). The modified UL signals are designed for purposes different from the purpose of network resource and configuration adaptation/transition. Thus, these signals may be appropriately modified/extended/enhanced to have similar characteristics as the TRS and achieve a similar effect as the TRS discussed above.

Figure 14A:
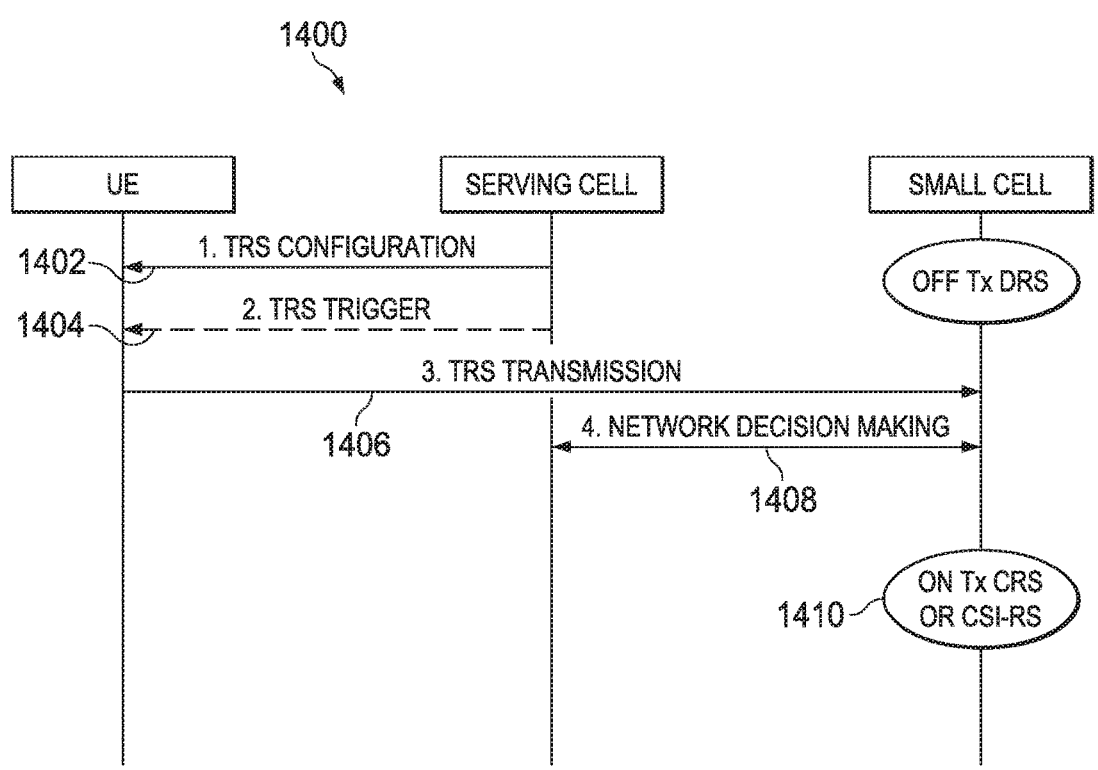
FIG. 14A illustrates a flow chart of adaption using TRS transmissions.
Figure 14B:
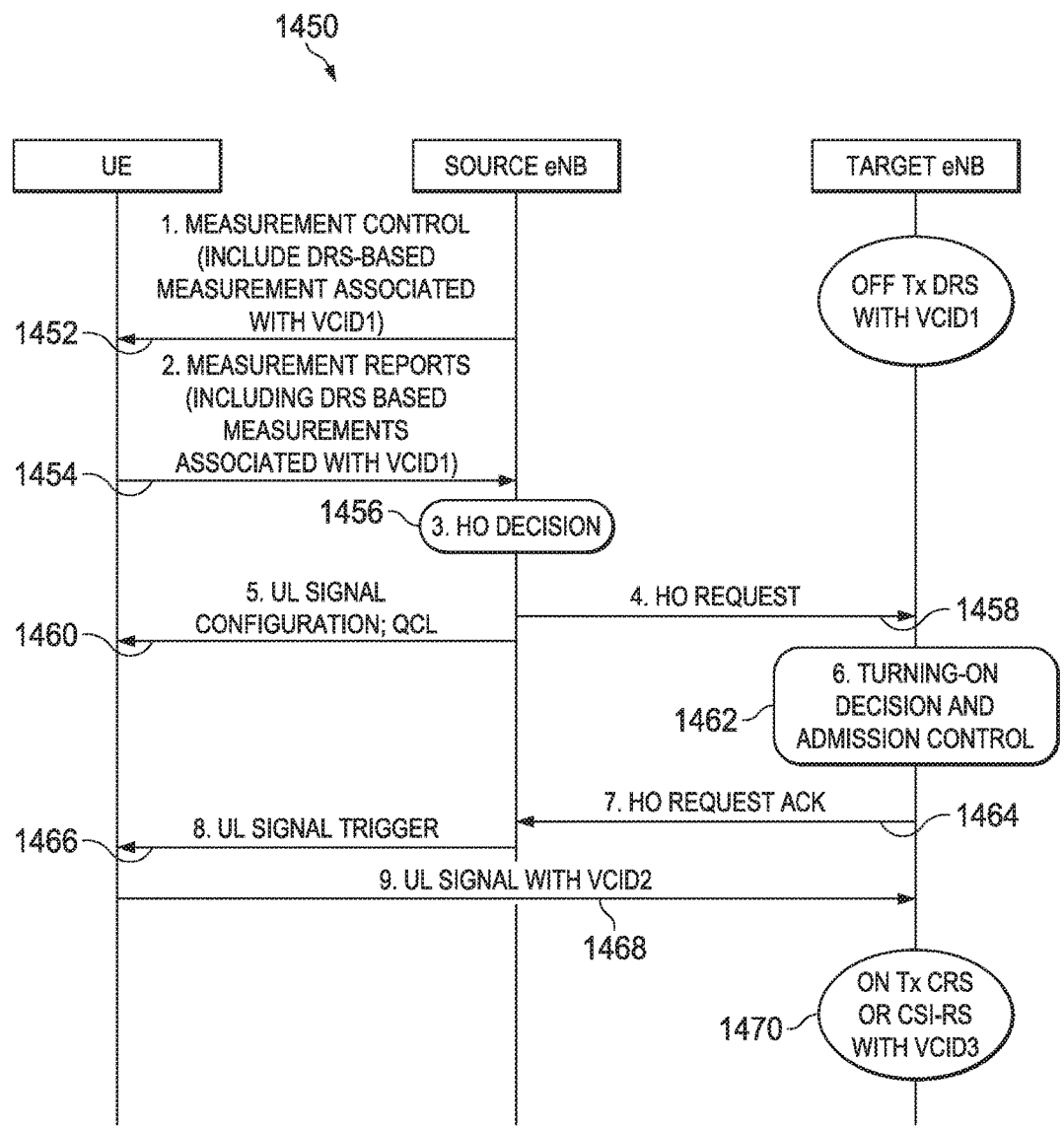
FIG. 14B illustrates a flow chart of adaptation using TRS and DRS transmissions.

In various embodiments, TRS transmissions may be used alone for small cell adaptation transition solutions. For example, FIG. 14A illustrates a process flow 1400 for a TRS based signaling approach without DRS transmissions. As illustrated in FIG. 14B, various transmissions/measurements may be conducted between a UE, a serving eNodeB (e.g., a Macro eNodeB or a small cell serving the UE), and a small cell. Initially, the small cell may be in a reduced activity mode without active CRS or CSI-RS transmissions. The small cell may not be transmitting DRS for network discovery/adaption.

In step 1402, the serving cell configures the UE with TRS transmission parameters (e.g., power levels, time-frequency resources, hopping-patterns, and the like). The TRS transmission parameters may be signaled using upper layer signaling, such as Layer 3 RRC signaling. In step 1404, the serving cell may transmit a TRS trigger to the UE, for example, over the physical layer (layer 1). The TRS trigger may be based on a desire to handover the UE to another cell, which may be indicated based on UE signal quality (e.g., pathloss), QoS requirements, network load, and the like. Alternatively, TRS transmission configuration may include thresholds for triggering TRS transmissions. In step 1406, due to the TRS transmission trigger, the UE may transmit a TRS using the configured parameters received in step 1402. TRS may be a lower layer (e.g., layer 1 or layer 2) UL transmission. In step 1408, the network decides whether to transition the small cell to an active Tx/Rx mode based on the received TRS. Communications between the serving cell and the small cell regarding the transition may be conducted over backhaul. In step 1410, the small cell transitions to an active Tx/Rx mode and transmits RS, such as CRS or CSI-RS. Alternatively, the small cell may remain in a reduced activity mode.

In various embodiments, TRS transmissions and DRS transmissions may be combined for small cell adaptation transition solutions. For example, FIG. 14B illustrates a process flow 1450 for a DRS and TRS based signaling approach. As illustrated in FIG. 14B, various transmissions/measurements may be conducted between a UE, a source eNodeB (e.g., a Macro eNodeB), and a target eNodeB (e.g., a small cell). Initially, the target eNodeB may be in a reduced activity mode without active CRS or CSI-RS transmissions. However, the target eNodeB may be transmitting DRS for network discovery/adaption.

In step 1452, the source eNodeB configures the UE with measurement control parameters for DL-based transition measurements. For example, the eNodeB may configure the UE with a VCID to make DL-based measurements (e.g., DRS measurements). The configured VCID (e.g., VCID1) may correspond with the target eNodeB. In step 1454, the UE takes the measurements of DRS transmissions from the target eNodeB (VCID1) and reports these measurements to the source eNodeB.

In step 1456, based on the measurement data, the source eNodeB determines whether to transition the target eNodeB to an active Tx/Rx mode and the hand over UE transmissions to the target eNodeB. Assuming the hand over decision is positive, the source eNodeB sends a handover request to the target eNodeB in step 1458. In step 1460, the eNodeB may further transmit TRS transmission parameters to the UE. The configured parameters may include identifying a reference serving cell having a QCL relationship with a virtual cell configured to be a target receiver of the TRS. The configured virtual cell may have a different VCID (e.g., VCID2) than the VCID configured for DL measurements (e.g., VCID1) even though the physical cell corresponding to both VCID1 and VCID2 is the target eNodeB.

In step 1462 and 1464, the target cell determines whether to accept the hand over request and if so, transmits a hand over request acknowledgement to the source eNodeB. After receiving the hand over request acknowledgement, the source eNodeB sends a TRS trigger to the UE in step 1466. In step 1468, the UE sends a TRS based on the transmission parameters configured in step 1460. In step 1470, the target eNodeB transitions to an active Tx/Rx mode and transmits RS, such as CRS or CSI-RS, for serving the UE. The target eNodeB may be assigned yet another VCID (e.g., VCID3) for active communications with the UE. The assignment of various VCIDs may allow the network to have greater flexibility in UE communication management.

An embodiment includes reusing discovery reference signal (DRS) design in downlink for uplink TRS. Various embodiments address energy saving in addition to other issues, such as interference management, network resource management, CoMP Scenario 4, Active Antenna Systems (AASs), and so on. These embodiments allow the network resource to flexibly and robustly adapt to traffic demand. Furthermore, various embodiments consider CoMP scenario 4, which may also be termed a virtual cell scenario, allows an eNodeB to have higher capability and flexibility of coordinating all the network resources within a certain area, including RRHs, Picos, and the like.

An embodiment may be used for a wider range of time scales, possibly ranging from seconds/minutes to longer times, but Energy Saving is focused on turning on/off less than two to three times a day, mainly done when the network traffic load is very low (e.g., around midnight time). Generally, low overhead and fast switching are supported by various embodiments (subject to stability), which can be done utilizing the virtual cell concept such as no cell-level handover. For this reason, the network resource adaptation that can be supported by various embodiments is generally more flexible and not limited to low load traffic, e.g., midnight time.

Energy Saving thus far allows only on/off switching. Various embodiments are not limited to only on/off switching. For example, virtual cell/AAS/DAS changing its configuration, such as including/excluding some network points within a shared cell-ID area, may be allowed. Change transmission power levels such as increasing or decreasing power may be allowed. A component carrier starting to transmit and/or receiving may be allowed. In TDD the changing of UL/DL configuration may be allowed. Another UE monitoring the TRS to establish a direct mobile communication may be allowed.

Various embodiments use UL transmissions (TRS transmissions) from a UE to transition small cells between a reduced activity mode and an active Tx/Rx mode. The network may configure transmission parameters of TRS on various UEs (e.g., power level, hopping patterns, time-frequency resources, a target virtual cell, a reference serving cell, and the like). In some embodiments, TRS may be modified versions of existing uplink signals such as RACH and/or SRS. TRS transmissions may be triggered when the UE handover to another serving cell is desirable (e.g., based on UE signal quality, network load, and the like). UL based transitions may include various advantages. For example, UEs may discover reduced activity mode small cells without a priori knowledge of network topology or network assistance. Furthermore, persistent transmission of DL RS (e.g., DRS) may not be necessary. Alternatively, TRS and DRS transmissions may be used in combination of small cell activity mode transitioning.

Figure 15:
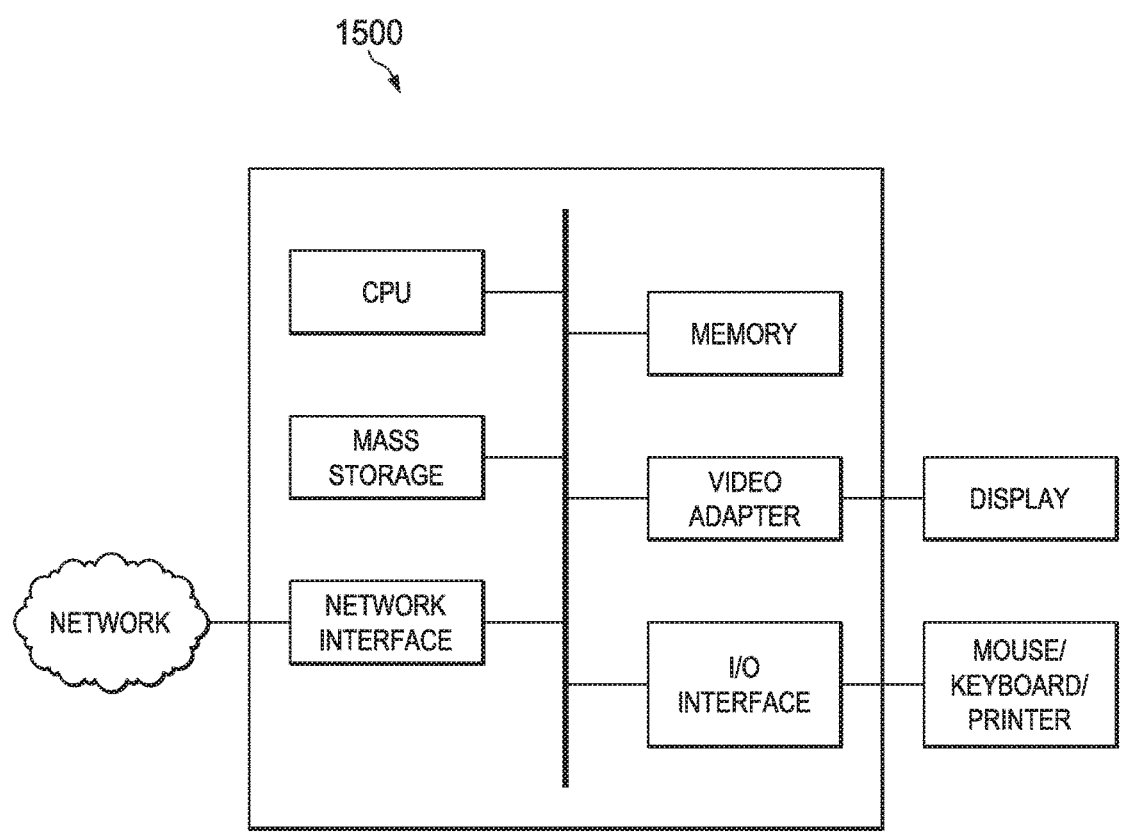
FIG. 15 is a block diagram illustrating a computing platform that may be used for implementing, for example, the devices and methods described herein, in accordance with an embodiment.

FIG. 15 is a block diagram of a processing system 1500 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for cell mode adaptation comprising:
receiving, by a user equipment (UE) from a first cell, one or more transmission parameters for a first reference signal (RS), one or more second cells transitioning between a reduced activity mode and an active transmission and reception mode in accordance with the first RS;
determining, by the UE, whether to transmit the first RS in accordance with one or more RS transmission criteria; and
transmitting, by the UE, the first RS in accordance with the one or more transmission parameters in response to the UE determining to transmit the first RS.

2. The method of claim 1, the transmitting, by the UE, the first RS comprising scrambling the first RS with a RS-specific sequence, and a second RS scrambled with the RS-specific sequence being transmitted by another UE.

3. The method of claim 1, the determining, by the UE, whether to transmit the first RS comprising:
transmitting, by the UE, a measurement data regarding the one or more RS transmission criteria; and
receiving a RS transmission trigger in accordance with the measurement data.

4. The method of claim 1, the determining, by the UE, to transmit the first RS comprising comparing the one or more RS transmission criteria with one or more RS transmission triggering thresholds defined by the one or more transmission parameters.

5. The method of claim 1, the transmitting, by the UE, the first RS comprising transmitting the first RS to a target virtual cell in accordance with a virtual cell identification (VCID) defined by the one or more transmission parameters.

6. The method of claim 5, the transmitting, by the UE, the first RS further comprising transmitting the first RS in accordance with reference signals from a reference serving cell defined by the one or more transmission parameters.

7. The method of claim 6, the reference serving cell having a quasi-co-located relationship with the target virtual cell.

8. The method of claim 1, the transmitting, by the UE, the first RS comprising transmitting the first RS in accordance with a power level or a power control equation defined by the one or more transmission parameters.

9. The method of claim 1, the transmitting, by the UE, the first RS comprising transmitting the first RS on a hopping pattern defined by the one or more transmission parameters.

10. The method of claim 9, the hopping pattern being in accordance with a UE identification of the UE, a number of resource elements assigned for RS transmissions by the one or more transmission parameters, a level of desire to offload the UE by a cell serving the UE, or a combination thereof.

11. A user equipment (UE) comprising:
a non-transitory memory storage comprising instructions; and
one or more processors in communication with the memory storage, wherein the one or more processors execute the instructions to:
determine one or more transmission parameters received from a first cell for a reference signal (RS), wherein one or more second cells is transitioned between a reduced activity mode and an active transmission and reception mode in accordance with the RS;
determine whether to transmit the RS in accordance with one or more RS transmission criteria; and
transmit the RS in accordance with the one or more transmission parameters in response to the UE determining to transmit the RS.

12. The UE of claim 11, wherein the one or more transmission parameters comprises one or more of the following: a hopping pattern, a power level, a power control equation, assigned time-frequency resources, a RS-specific scrambling sequence, a RS transmission triggering threshold, a virtual cell identification (VCID) for a target virtual cell configured as a target receiver of the RS, or a reference serving cell having a quasi-co-location relationship with the target virtual cell.

13. The UE of claim 12, wherein the RS-specific scrambling sequence is common to multiple RSs transmitted from multiple UEs.

14. The UE of claim 11, wherein a cyclic shift offset is applied the RS.

15. A method for cell mode adaption comprising:
configuring, by a base station of a first cell, one or more transmission parameters for a reference signal (RS), one or more second cells transitioning between a reduced activity mode and an active transmission and reception mode in accordance with the RS; and
transmitting, by the base station of the first cell, the one or more transmission parameters to a user equipment (UE).

16. The method of claim 15 further comprising:
determining transition metrics in accordance with a plurality of received RSs, the RS being one of the plurality of received RSs; and
determining whether to transition the one or more second cells from the reduced activity mode to the active transmission and reception mode in accordance with the transition metrics.

17. The method of claim 15,
the configuring, by the base station of the first cell, the one or more transmission parameters comprising configuring a target virtual cell as a target receiver of the RS, and
the transmitting, by the base station of the first cell, the one or more transmission parameters comprising transmitting a virtual cell identification (VCID) of the target virtual cell.

18. The method of claim 17, the configuring, by the base station of the first cell, the one or more transmission parameters comprising identifying a reference serving cell having a quasi-co-located relationship with the target virtual cell.

19. The method of claim 15, further comprising triggering, by the base station of the first cell, transmission of the RS by the UE in accordance with one or more RS transmission criteria.

20. The method of claim 19, further comprising receiving measurement data regarding the one or more RS transmission criteria, the triggering the transmission of the RS being in accordance with the measurement data.

21. The method of claim 19, the triggering the transmission of the RS comprising group triggering multiple UEs to each transmit a respective RS.

22. The method of claim 19, the triggering the transmission of the RS comprising:
scrambling a cyclic redundancy check (CRC) of a physical downlink control channel (PDCCH) with a radio network temporary identification in accordance with a RS trigger,
transmitting the PDCCH order containing a sequence index in accordance with the RS trigger, or
a combination thereof.

23. A first network cell comprising a base station with:
a non-transitory memory storage comprising instructions; and
one or more processors in communication with the memory storage, wherein the one or more processors execute the instructions to:
configure one or more transmission parameters for a reference signal (RS), wherein one or more second cells is transitioned between a reduced activity mode and an active transmission and reception mode in accordance with the RS;
transmit the one or more transmission parameters to a user equipment (UE); and
trigger transmission of the RS by the UE in accordance with one or more RS transmission criteria.

24. The first network cell of claim 23, wherein the instructions to trigger transmission of the RS comprise instructions to simultaneously trigger multiple UEs to each transmit a respective RS.

25. The first network cell of claim 24, wherein the instructions to trigger transmission of the RS comprise instructions to:
scramble a cyclic redundancy check (CRC) of a physical downlink control channel (PDCCH) with a radio network temporary identification in accordance with a RS trigger,
transmit a PDCCH order containing a sequence index in accordance with the RS trigger, or
a combination thereof.

* * * * *